United States Patent
Lindheimer et al.

(10) Patent No.: US 10,993,199 B2
(45) Date of Patent: Apr. 27, 2021

(54) RADIO NETWORK NODE, UE AND METHODS PERFORMED THEREIN FOR HANDLING COMMUNICATION IN A WIRELESS COMMUNICATION NETWORK

(71) Applicant: Telefonaktiebolaget LM Ericsson (publ), Stockholm (SE)

(72) Inventors: Christofer Lindheimer, Linköping (SE); Malik Wahaj Arshad, Upplands Väsby (SE); Gunnar Mildh, Sollentuna (SE); Thomas Walldeen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/479,012

(22) PCT Filed: Apr. 3, 2019

(86) PCT No.: PCT/SE2019/050307
§ 371 (c)(1),
(2) Date: Jul. 18, 2019

(87) PCT Pub. No.: WO2019/194733
PCT Pub. Date: Oct. 10, 2019

(65) Prior Publication Data
US 2020/0288423 A1 Sep. 10, 2020

Related U.S. Application Data

(60) Provisional application No. 62/652,930, filed on Apr. 5, 2018.

(51) Int. Cl.
*H04W 60/00* (2009.01)
*H04W 8/26* (2009.01)

(52) U.S. Cl.
CPC ............ *H04W 60/00* (2013.01); *H04W 8/26* (2013.01)

(58) Field of Classification Search
CPC ....... H04W 60/00; H04W 8/26; H04W 28/06; H04W 74/08; H04W 76/27
(Continued)

(56) References Cited

U.S. PATENT DOCUMENTS

2019/0174421 A1* 6/2019 Quan ..................... H04W 76/30
2019/0200265 A1* 6/2019 Yu .......................... H04W 76/10
(Continued)

FOREIGN PATENT DOCUMENTS

EP    3 155 861 B1    4/2017

OTHER PUBLICATIONS

International Search Report and Written Opinion of the International Searching Authority, PCT/SE2019/050307, dated Jun. 13, 2019, 17 pages.
(Continued)

Primary Examiner — Michael Y Mapa
(74) Attorney, Agent, or Firm — Sage Patent Group

(57) ABSTRACT

A method by a UE is provided to handle communication in a network, wherein the UE is capable of receiving a registration area configuration including area identifiers associated with different cells of different RATs. The UE receives, from a network node, a first mobile identifier and a second mobile identifier in a message during a transition of states of the UE, wherein the first mobile identifier is of a first length and the second mobile identifier is of a second length different than the first length. Furthermore, the UE uses the first mobile identifier to resume to a first network node of a first RAT in the registration area configuration of the UE,
(Continued)

and the second mobile identifier to resume to a second network node of a second RAT in the registration area configuration of the UE.

16 Claims, 27 Drawing Sheets

(58) Field of Classification Search
USPC .... 455/432.1–445, 450–452.2; 370/252, 331
See application file for complete search history.

(56) References Cited

U.S. PATENT DOCUMENTS

2019/0320483 A1* 10/2019 Palat .................. H04W 76/19
2019/0342804 A1* 11/2019 Futaki ................. H04W 36/14
2019/0349833 A1* 11/2019 Peng .................. H04W 76/27

OTHER PUBLICATIONS

Ericsson, "I-RNTI discussion", 3GPP TSG-RAN WG2 #101, Athens, Greece, Feb. 26-Mar. 2, 2018, Tdoc R2-1802365, XP51399503A, 3 Pages.

$3^{rd}$ Generation Partnership Project; Technical Specification Group Radio Access Network; NR; NR and NG-RAN Overall Description; Stage 2 (Release 15), 3GPP TS 38.300, V15.1.0 (Mar. 2018), Apr. 2, 2018, XP051450731, 71 Pages.

* cited by examiner

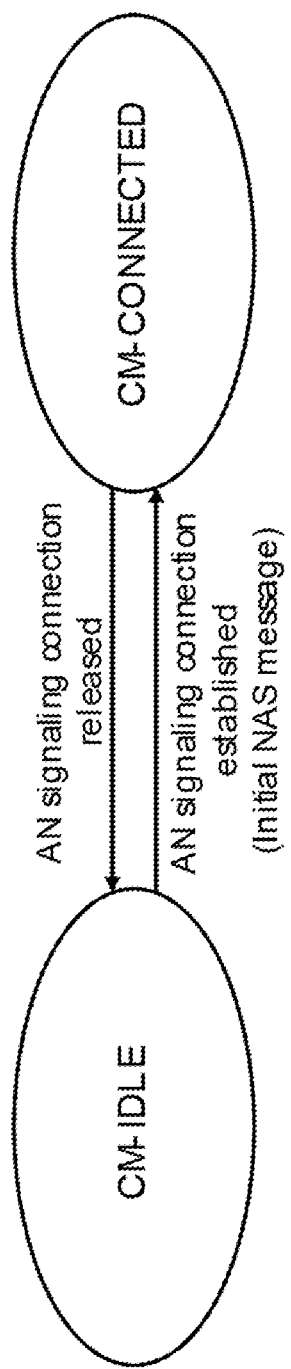
Fig. 1B: CM state transition in UE
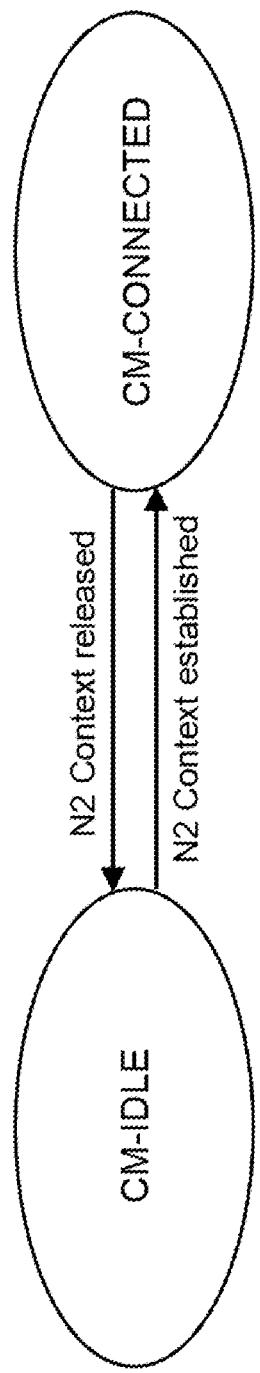
Fig. 1C: CM state transition in AMF

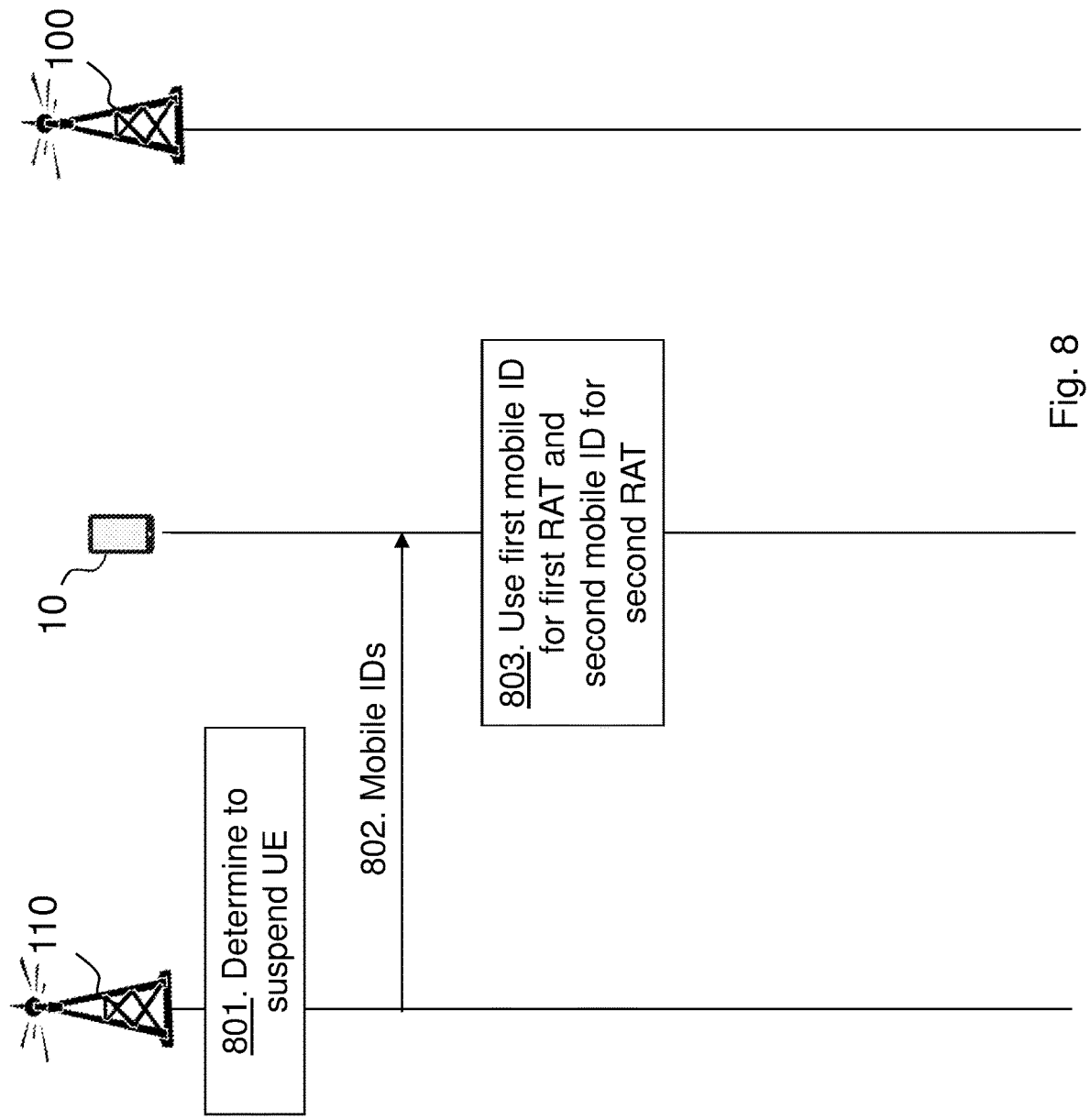

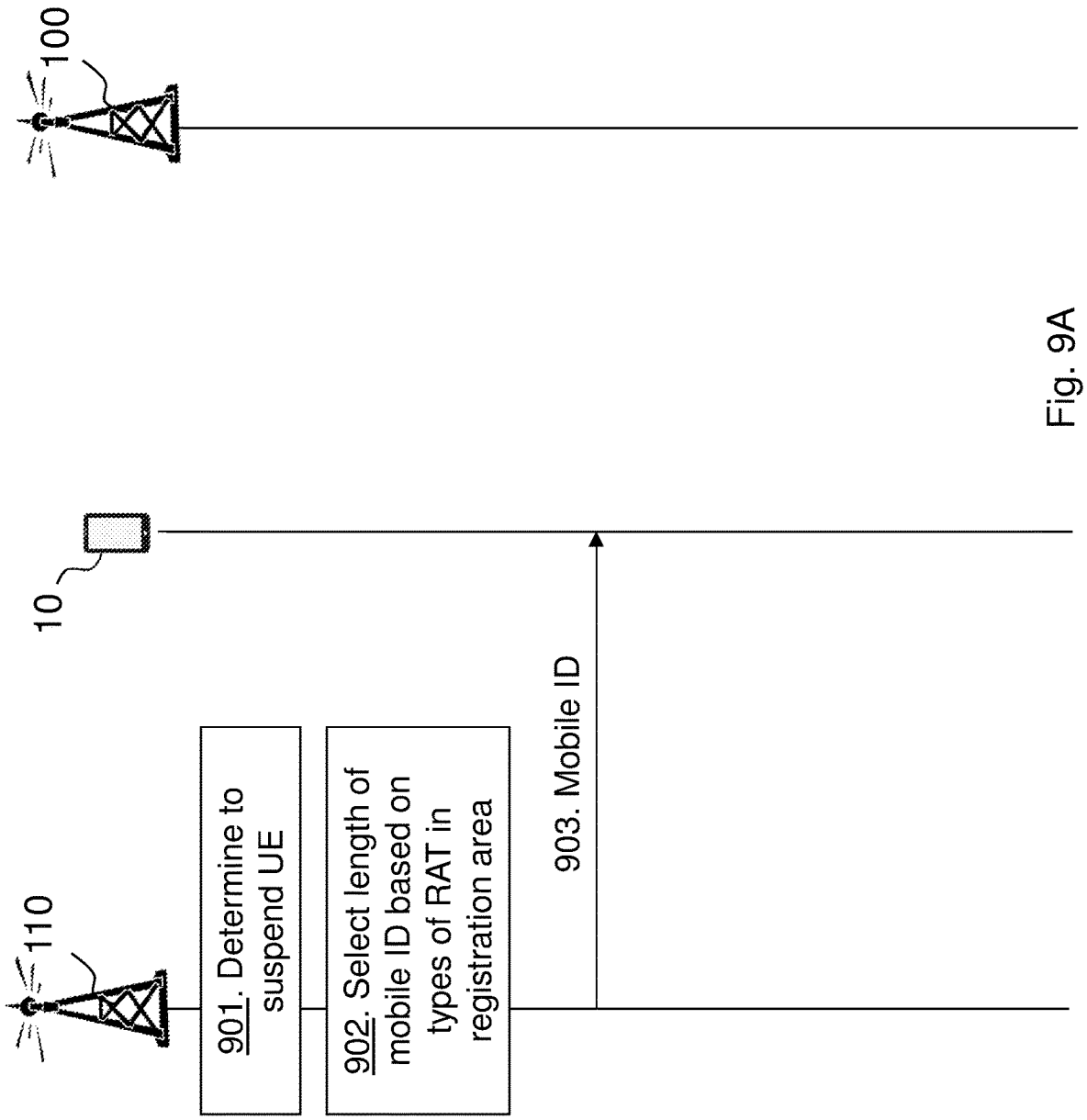

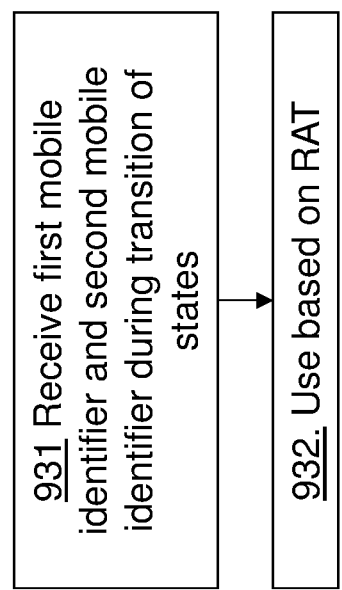

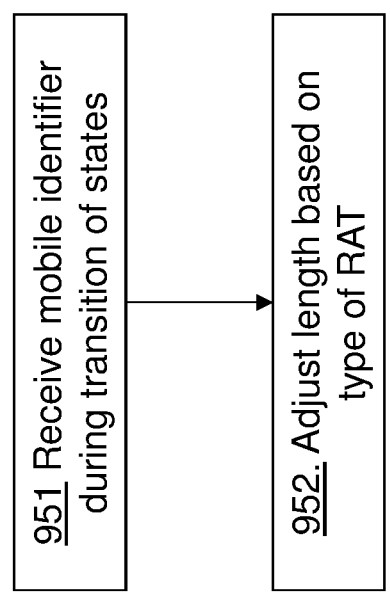

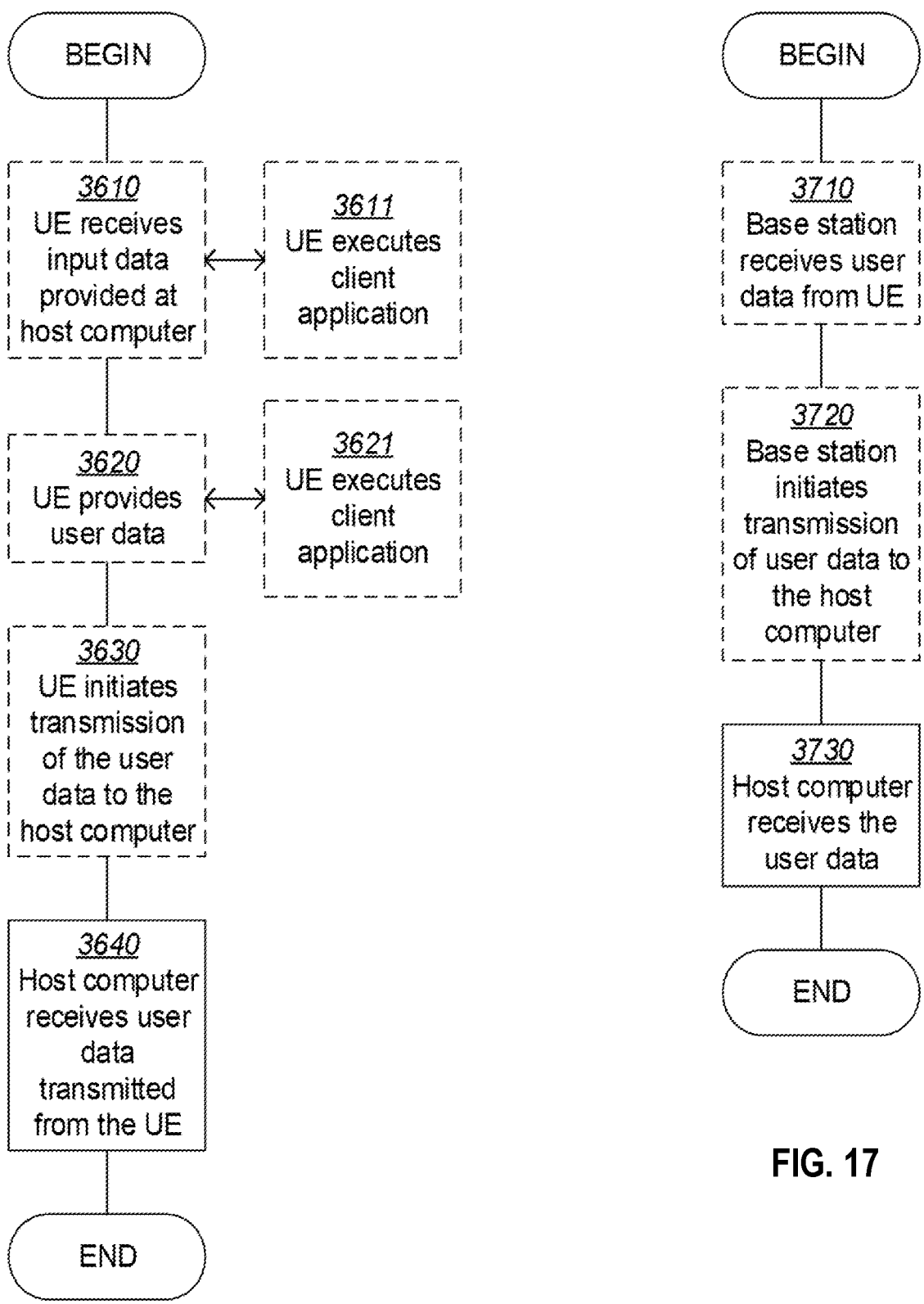

RADIO NETWORK NODE, UE AND METHODS PERFORMED THEREIN FOR HANDLING COMMUNICATION IN A WIRELESS COMMUNICATION NETWORK

This application is a 35 U.S.C. § 371 national stage application of PCT International Application No. PCT/SE2019/050307 filed on Apr. 3, 2019, which in turns claims domestic priority to U.S. Provisional Patent Application No. 62/652,930, filed on Apr. 5, 2018, the disclosures and content of which are incorporated by reference herein in their entirety.

TECHNICAL FIELD

Embodiments herein relate to a radio network node, a user equipment (UE) and methods performed therein regarding wireless communication. Furthermore, a computer program and a computer-readable storage medium are also provided herein. In particular, embodiments herein relate to handling communication, e.g. handling or enabling communication, related to registration areas such as radio access network (RAN) Notification Areas (RANAS), of the UE in a wireless communication network.

BACKGROUND

In a typical wireless communication network, UEs, also known as wireless communication devices, mobile stations, stations (STA) and/or wireless devices, communicate via a Radio access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a "NodeB" or "eNodeB" or "gNodeB". The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN or LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Scheduled reference signals, called channel-state information reference signals (CSI-RS), are transmitted when needed for a particular connection. Channel-state information (CSI) comprises channel quality indicator (CQI), precoding matrix indicator (PMI), and rank indicator (RI). The CQI is reported by the UE to the radio network node. The UE indicates a modulation scheme and a coding scheme to the radio network node. To predict the downlink channel condition, CQI feedback by the UE may be used as an input. CQI reporting can be based on PMI and RI. PMI is indicated by the UE to the radio network node, which precoding matrix may be used for downlink transmission which is determined by the RI. The UE further indicates the RI to the radio network node, i.e. the RI indicates the number of layers that should be used for downlink transmission to the UE. The decision of when and how to transmit the CSI-RS is made by the radio network node and the decision is signalled to the involved UEs using a so-called measurement grant. When the UE receives a measurement grant it measures on a corresponding CSI-RS. The radio network node may choose to transmit the CSI-RSs to a UE only using beam(s) that are known to be strong for that UE, to allow the UE to report more detailed information about those beams. Alternatively, the radio network node may choose to transmit the CSI-RSs also using beam(s) that are not known to be strong for that UE, for instance to enable fast detection of new beam(s) in case the UE is moving.

The radio network nodes of a new radio (NR) network transmit other reference signals as well. For instance, the radio network nodes may transmit so-called demodulation reference signals (DMRS) when transmitting control information or data to a UE. Such transmissions are typically made using beam(s) that are known to be strong for that UE.

In the new 5G standard, the system and architecture for 5G and various state machines are described.

One "state machine" is the connection management state model or CM-state model, described in 3GPP TS 23.501.

Generally, connection management (CM) comprises of functions for establishing and releasing signalling connections between a UE and a core network node. For 5G this node is called an Access and Mobility Management Function (AMF) node.

FIG. 1A illustrates an example of a 5G system architecture, including nodes (e.g., AMF node, UE, (R)AN) and interface names. Connection management is about signalling connection over the N1 interface illustrated in FIG. 1A.

This signalling connection over N1 is used to enable Non-Access-Stratum (NAS) signalling exchange between the UE and the core network. It comprises both the Access Node (AN) signalling connection, between the UE and the AN, and the N2 connection, between the AN and the AMF node.

There are two CM-states defined, CM-IDLE and CM-CONNECTED.

A UE in CM-IDLE has no NAS signalling connection established over N1 to the AMF and in this CM-state, the UE performs cell selection and/or cell reselection and public land mobile network (PLMN) selection. In addition, there is no AN signalling connection or N2/N3 connections for a UE in CM-IDLE.

If the UE is registered to the network and in CM-IDLE; the UE may usually listen to and respond to paging messages from the network. This means that in CM-IDLE the UE is still reachable. If initiated by the UE, the UE shall also be able to perform a service request procedure.

A UE in CM-CONNECTED is a UE that has established an AN signalling connection between the UE and the AN, and it has entered the RRC_CONNECTED state over 3GPP access. Over this connection, the UE can transmit an initial NAS message (for example a service request) and this message initiates the transition from CM-IDLE to CM CONNECTED in the AMF node, see FIG. 1B. From FIG. 1C, it is also realized that the CM-CONNECTED state also requires an N2 connection between the AN and the AMF node. The reception of initial N2 message, e.g., N2 Initial UE message, initiates the transition for the AMF node from CM-IDLE to CM-CONNECTED state.

In the CM-CONNECTED state, the UE can transmit data, and it shall be ready to enter CM-IDLE, whenever the AN signalling connection is released. The AMF enters CM-IDLE whenever the logical N1 signalling connection and the N3 user plane connection are released.

In a similar way as in the AMF node, there is also a state model in the AN, the access network. Here from, we will use the term "gNB" for the access network node, but it may equally well be another node type, e.g., an ng-eNB, an eNB. The term "gNB" shall thus be considered as an example, rather than a limitation in the disclosure.

One state model in the gNB is the RRC State machine.

A UE can either be in the following RRC states: RRC_CONNECTED, RRC_INACTIVE or RRC_IDLE.

FIG. 1D is an illustration of how the intention is that the RRC State machine will work and the messages used to trigger/transition a UE between the states. The indications in parenthesis (SRB0, SRB1) indicate what signalling radio bearer that can be used to transition the UE between the states. The FIG. 1D shows the principles for transition, not necessarily all the messages will have the same names in a final standard.

The mapping between the different state machines, the one in the AN and the one in the AMF node, is such that CM-CONNECTED can map to either RRC_CONNECTED or RRC_INACTIVE—while CM-IDLE always map to RRC_IDLE.

A UE is either in RRC_CONNECTED state or in RRC_INACTIVE state when an RRC connection has been established. If this is not the case, i.e. no RRC connection is established, the UE is in RRC_IDLE state. These different states are further described in 3GPP TS 38.331 v. 15.0.0.

In RRC_IDLE, the UE is configured to listen to a paging channel at certain occasions and it performs cell (re)selection procedures and listen to system information.

In RRC_INACTIVE, the UE is also listening to paging channel and does cell (re)selection procedures, but in addition, it also maintains a configuration and the configuration is also kept on the network side, such that, when needed, e.g., when data arrives to the UE, it doesn't require a complete setup procedure to start transmitting data.

In RRC_CONNECTED, there is transfer of data to or from the UE and the network controls the mobility. This means that the network controls when the UE should handover to other cells. In connected state, the UE still monitors the paging channel and it monitors control channels that are associated with whether there is data for the UE or not. It provides channel quality and feedback information to the network and it performs neighbouring cell measurement and reports these measurements to the network.

When a UE is in CM-CONNECTED state and RRC_INACTIVE state the following applies:
UE reachability is managed by the RAN, with assistance information from core network;
UE paging is managed by the RAN.
UE monitors for paging with UE's CN, 5G System Architecture Evolution-Temporary Mobile Subscriber Identity (S-TMSI), and a RAN identifier e.g. Radio Network Temporary Identifier (RNTI).

The AMF node, based on network configuration may provide assistance information to the NG-RAN, to assist the NG-RAN's decision whether the UE can be sent to the RRC Inactive state.

The RRC Inactive assistance information may for example include:
UE specific discontinuous reception (DRX) values;
The Registration area configuration provided to the UE, sometimes referred to as tracking area identifier (TAI)-list below;
Periodic Registration Update timer;
If the AMF node has enabled Mobile Initiated Connection Only (MICO) mode for the UE, an indication that the UE is in MICO mode.
Information from the UE permanent identifier, as defined in TS 38.304 v.15.0.0, that allows the RAN to calculate the UE's RAN paging occasions.

The RRC Inactive assistance information mentioned above is provided by the AMF node during N2 activation with the (new) serving NG-RAN node, i.e. during Registration, Service Request, handover, to assist the NG RAN's decision whether the UE can be sent to the RRC Inactive state. The RRC Inactive state is part of the RRC state machine, and it is up to the RAN to determine the conditions to enter the RRC Inactive state. If any of the parameters included in the RRC Inactive Assistance Information changes as the result of NAS procedure, the AMF node may update the RRC Inactive Assistance Information to the NG-RAN node.

The state of the N2 and N3 reference points are not changed by the UE entering CM-CONNECTED with RRC Inactive state. A UE in RRC inactive state is aware of the RAN Notification area (RNA).

A UE in the RRC_INACTIVE state can be configured with a RAN-based Notification Area (RNA), where:
the RNA can cover a single or multiple cells, and may be smaller than a CN Registration area;
a RAN-based notification area update (RNAU) is periodically sent by the UE and is also sent when the cell reselection procedure of the UE selects a cell that does not belong to the configured RNA.

There are several different alternatives on how the RNA can be configured:
List of cells:
A UE provides an explicit list of cells (one or more) that constitute the RNA.
List of RAN areas:
A UE provides (at least one) RAN area ID, where a RAN area is a subset of a CN Tracking Area;
A cell broadcasts (at least one) RAN area ID in the system information so that a UE knows which area the cell belongs to.
List of Tracking Area Identifiers (TAI). In CM-IDLE, it is the core network that is in charge of UE reachability and the core network does this through configuring a CN registration area that is defined by a set of Tracking Areas (TAs). The UE is configured with the CN registration area through a list of TAI's and this CN Registration area is here from referred to as "TAI-list".

At transition into CM-CONNECTED with RRC Inactive state, the NG-RAN configures the UE with a periodic RAN Notification Area Update timer taking into account the value of a Periodic Registration Update timer value indicated in the RRC Inactive Assistance Information, and uses a guard timer with a value longer than the RAN Notification Area Update timer value provided to the UE.

If the periodic RAN Notification Area Update guard timer expires in RAN, the RAN can initiate a AN Release procedure as specified in TS 23.502 v.15.0.0.

When the UE is in CM-CONNECTED with RRC inactive state, the UE performs PLMN selection procedures as defined in TS 23.122 v. 15.0.0 for CM-IDLE.

When the UE is CM-CONNECTED with RRC Inactive state, the UE may resume the RRC connection due to:
Uplink data pending;
Mobile initiated NAS signalling procedure;
As a response to RAN paging;
Notifying the network that it has left the RAN Notification area;
Upon periodic RAN update timer expiration.

When Resuming, the UE will include an identifier to the network that will inform the radio network node about where the UE context describing the specifics of the UE, e.g., bearers, Tracking Area, slices, security credentials/keys etc.,) such that resuming will bring the UE to an RRC_CONNECTED configuration similar to when it was resumed. The Identifier pointing to the UE Context is called Inactive Radio Network Temporary Identifier (I-RNTI). In connection to when the UE is suspended, i.e., it is transitioned from RRC_CONNECTED to RRC_INACTIVE, the UE is provided with an I-RNTI from the network. The network allocates an I-RNTI when transitioning the UE to RRC_INACTIVE and the I-RNTI is used to identify the UE context, i.e., as an identifier of the details stored about the UE in the network while in RRC_INACTIVE.

From the I-RNTI, the radio network node may be able to retrieve the context and, if resuming is, e.g., due to data, possibly move the UE to RRC_CONNECTED state. The I-RNTI thus need to indicate both where the UE context is stored such that the serving radio network node (gNB, ng-eNB) knows where to request the UE context from, and there is also a need to be a unique part in the I-RNTI for separating contexts within the node it has stored.

As an example, the length of the I-RNTI in gNB is agreed to be 52 bits. This will allow for both a long node identifier part as well as a UE-unique context identifier part. It is not yet standardized exactly what parts of the I-RNTI that should represent, e.g., node address or similar, but this may also simply be configured in the network.

The radio network node in a 5G system can either be a gNB, which is a radio network node using NR radio, or it can be an ng-eNB, which is a radio network node using LTE radio, but connects to the same 5G core network as the gNB. The ng-eNB will be serving cells with LTE radio and much of the air-interface protocols will be exactly the same as for LTE connecting to the Evolved Packet Core (EPC) through an eNB.

In the resume procedure, illustrated in FIG. 1E, The I-RNTI is sent in the RRCResumeRequest message, i.e., already in the first message. For various reasons, the message the RRCResumeRequest is carried in is referred to as msg3, or "message3".

The intention is that the resume request sent in msg3 may be a very small message only including the most necessary information to resume the connection. One of the important pieces of information to include though is an identifier that can allow the network to retrieve the UE specific information stored, i.e., the UE context. For this purpose, the I-RNTI is then included in the resume request message.

In LTE, msg3 is bit constrained and it is impossible to include an I-RNTI of the agreed 52 bit length. This will create a problem in particular when the suspend procedure included storing a UE context and identifying it with a 52-bit I-RNTI, but the resume procedure occurs in an LTE cell that can only handle I-RNTIs that are smaller.

A similar resume message that already existed in earlier versions of LTE connecting to EPC, for a slightly different functionality, had a 40-bit length and it is likely that the 40-bit length is what is possible to use as I-RNTI for an ng-eNB using LTE and connecting to a 5G core network and system.

As described above, there is a problem in using different lengths of mobile identifiers such as I-RNTIs.

If a UE is suspended by a gNB, i.e., a radio network node using a 52-bit I-RNTI and then, when the same UE should resume, will do that in an ng-eNB, that got a ResumeRequest message only capable of a 40-bit I-RNTI, a) how will the UE handle the difference; and b) how will the network treat the received I-RNTI and be able to relate it to where the UE context is stored and can be retrieved from.

There are no existing solutions for how to manage an I-RNTI over both ng-eNB (that can only manage 40 bit I-RNTI) and gNB (that allocates a 52-bit I-RNTI), i.e. how radio network nodes use identifiers for retrieving UE context when being capable handling identifiers of different lengths.

SUMMARY

An object of embodiments herein is to provide a mechanism that improves the performance of the wireless communication network in a wireless communication network.

According to an aspect the object is achieved by providing a method performed by a UE for handling communication in a wireless communication network. The UE is capable of receiving a registration area configuration consisting of area identifiers associated with different radio cells of different radio access technologies. The UE receives, from a radio network node, a first mobile identifier and a second mobile identifier in a message during a transition of states of the UE, wherein the first mobile identifier is of a first length and the second mobile identifier is of a second length being different than the first length. The UE further uses the first mobile identifier for resuming to a first radio network node of a first RAT in the registration area configuration of the UE, and the second mobile identifier for resuming to a second radio network node of a second RAT in the registration area configuration of the UE.

According to another aspect the object is achieved by providing a method performed by a radio network node for handling communication in a wireless communication network. The radio network node transmits, to a UE, a mobile identifier in a message during a transition of states, e.g. from active to in-active, of the UE, wherein a length of the mobile identifier is based on one or more types of RATs of cells in a registration area configuration such as a RAN notification area of the UE. The mobile identifier is associated with a UE context of the UE.

According to yet another aspect the object is achieved by providing a UE for handling communication in a wireless communication network. The UE is capable of receiving a registration area configuration consisting of area identifiers associated with different radio cells of different radio access technologies. The UE is configured to receive, from a radio network node, a first mobile identifier and a second mobile identifier in a message during a transition of states of the UE, wherein the first mobile identifier is of a first length and the second mobile identifier is of a second length being different than the first length. The UE is further configured to use the first mobile identifier for resuming to a first radio network node of a first RAT in the registration area configuration of the UE, and the second mobile identifier for resuming to a second radio network node of a second RAT in the registration area configuration of the UE.

According to still another aspect the object is achieved by providing a radio network node for handling communication in a wireless communication network. The radio network node is configured to transmit, to a UE, a mobile identifier in a message during a transition of states, e.g. from active to in-active, of the UE, wherein a length of the mobile identifier is based on one or more types of RATs of cells in a registration area configuration such as a RAN notification area of the UE. The mobile identifier is associated with a UE context of the UE.

It is furthermore provided herein a computer program product comprising instructions, which, when executed on at least one processor, cause the at least one processor to carry out the method according to the above, as performed by the UE or the radio network node, respectively. It is additionally provided herein a computer-readable storage medium, having stored thereon a computer program product comprising instructions which, when executed on at least one processor, cause the at least one processor to carry out the method according to the above, as performed by the UE or the radio network node, respectively.

According to some embodiments, when suspending a UE to RRC_INACTIVE, one of the aspects is that an RNA shall be configured for that UE. The RNA is the area in which the UE can move about without updating the RAN on its position. The RNA may comprise both cells that are served by a first RAT such as NR and radio network nodes and/or cells that are served using a second RAT such as LTE radio and ng-eNBs. Both the radio network nodes and cell types allow access to a 5G core network. When configuring the RNA for a certain UE, a radio network node is aware of what cell types there are and, if allocating any cell served by LTE and ng-eNB, the mobile identifier such as an I-RNTI that should be allocated to the UE context and used by the UE when resuming, should be a 40-bit I-RNTI. If the RNA only consists of cells that are served through NR radio and gNBs then the gNB should allocate a 52-bit mobile identifier such as an I-RNTI for such contexts and those UEs.

When suspending UEs having areas where an ng-eNB is included as serving at least one of the cells in the RNA, the allocated 40-bit I-RNTI may point to an ng-eNB rather than the gNB actually allocating the I-RNTI and suspending the UE.

When planning the network and adding gNBs, a radio network node of the first RAT such as a gNB may be, for purposes of finding UE context, allocated an identity of a radio network node of the second RAT such as an ng-eNB ID that is coordinated with identities of other ng-eNBs in the network. This means that the gNB will have both a gNB ID and an ng-eNB ID. The ng-eNB ID will be used as basis for allocation of 40-bit I-RNTIs when there are cells in the RNA that are served by real ng-eNBs that are not also gNBs, i.e., LTE cells.

With embodiments herein, the problem that e.g. a msg3 in a second RAT such as LTE connected to core network of a first RAT such as 5GC, cannot manage a 52-bit I-RNTI is solved by never forcing use of more than a 40-bit I-RNTI for such cells and nodes.

If a UE resumes in a cell served by an ng-eNB using LTE radio, a 40-bit I-RNTI is enough to be able to retrieve the UE context, irrespective of if it is stored in an ng-eNB or gNB.

BRIEF DESCRIPTION OF THE DRAWINGS

Embodiments will now be described in more detail in relation to the enclosed drawings, in which:

FIG. 1B illustrates CM-CONNECTED and CM-IDLE transition in UE;

FIG. 1C illustrates CM-CONNECTED and CM-IDLE transition in AMF node;

FIG. 8 illustrates a flow chart according to an aspect of embodiments herein;

FIGS. 9A-9C are schematic combined flowchart and signalling schemes according to some embodiments herein;

FIGS. 9D-9F are schematic flowcharts of methods performed by a UE or a radio network node according to embodiments herein;

FIG. 16 shows methods implemented in a communication system including a host computer, a base station and a user equipment in accordance with some embodiments; and FIG. 17 shows methods implemented in a communication system including a host computer, a base station and a user equipment in accordance with some embodiments.

DETAILED DESCRIPTION

Figure 1A:
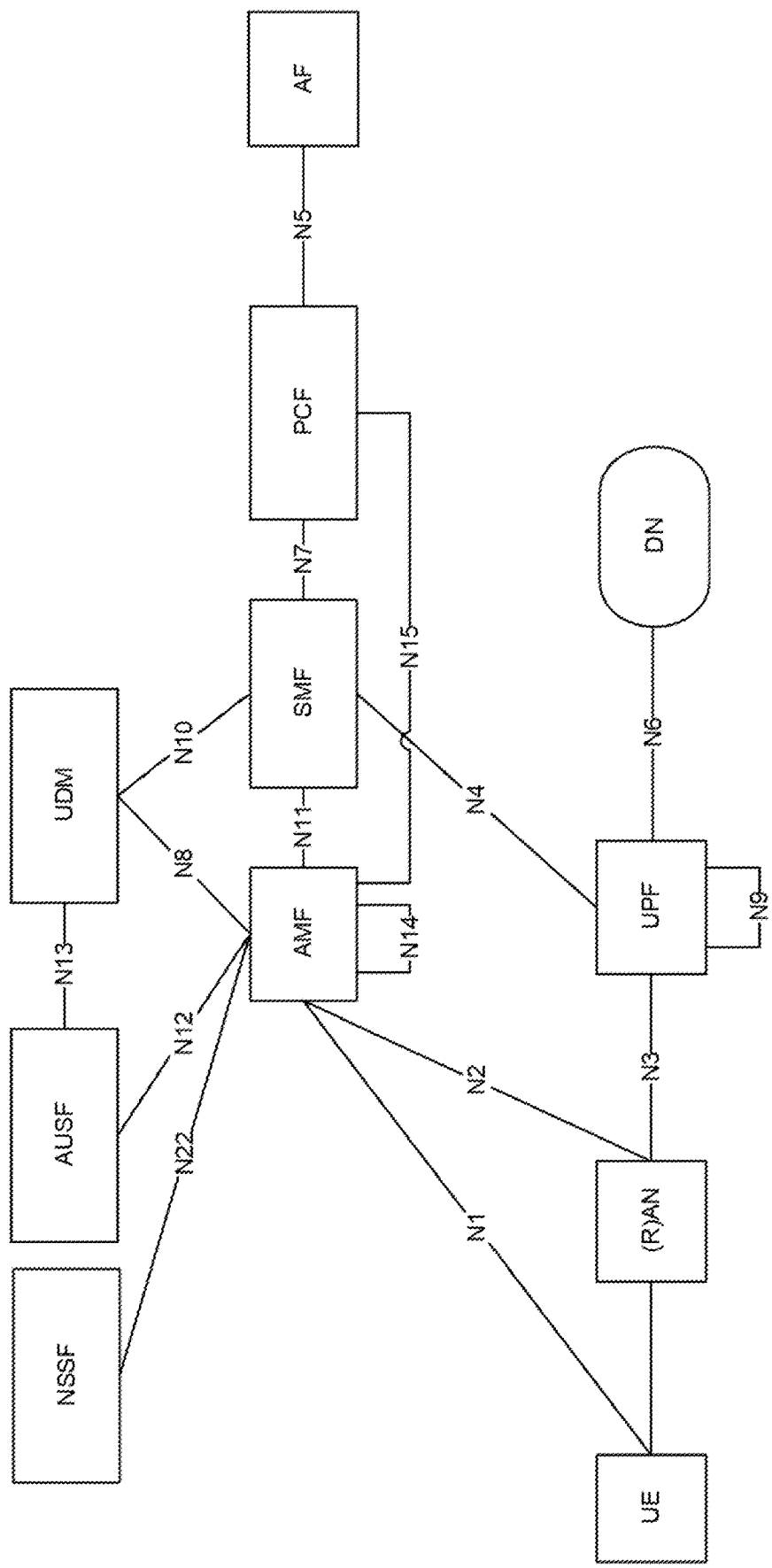
FIG. 1A illustrates an example of a 5G system architecture.
Figure 1D:
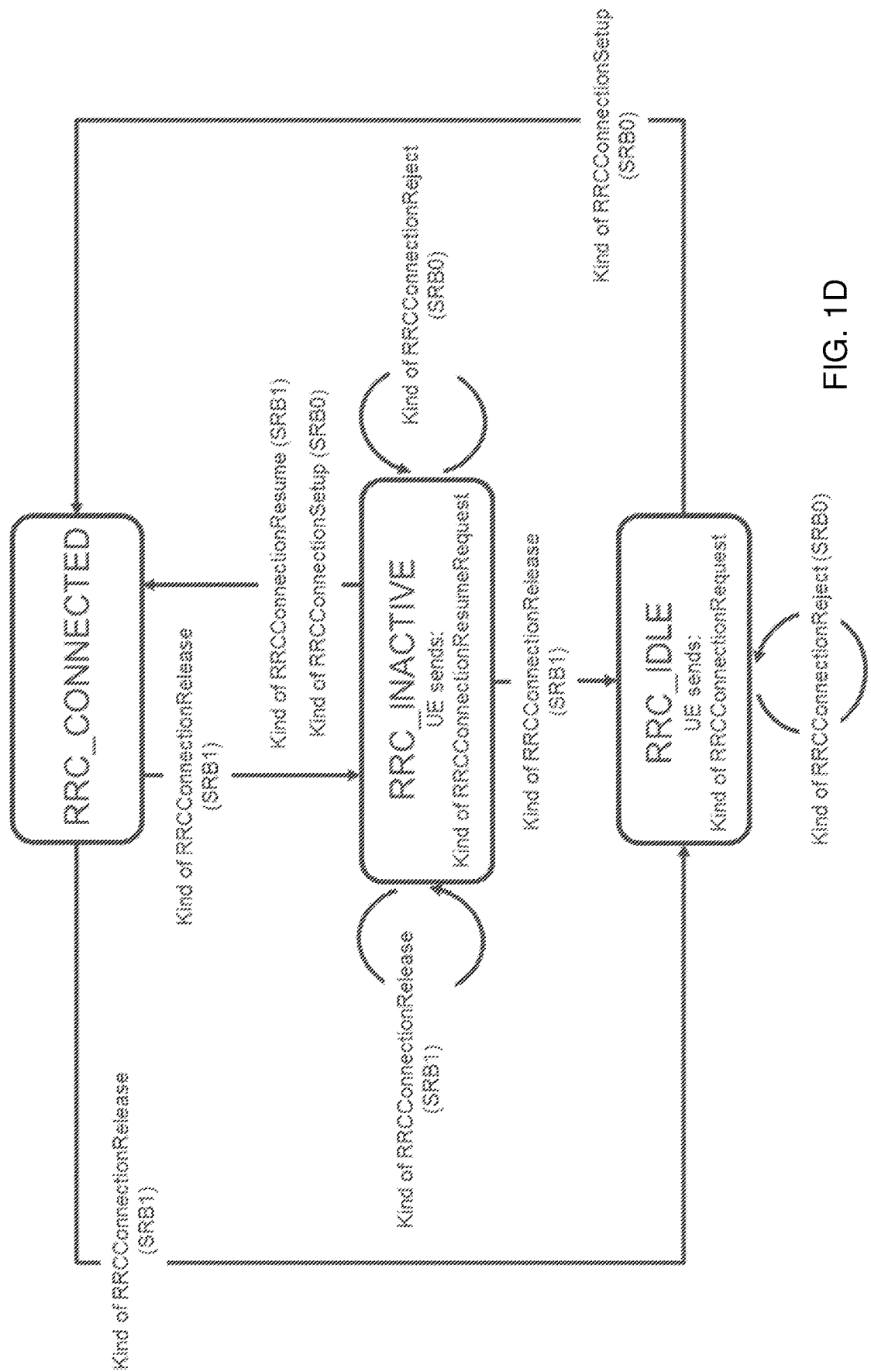
FIG. 1D illustrates RRC state transitions.
Figure 1E:
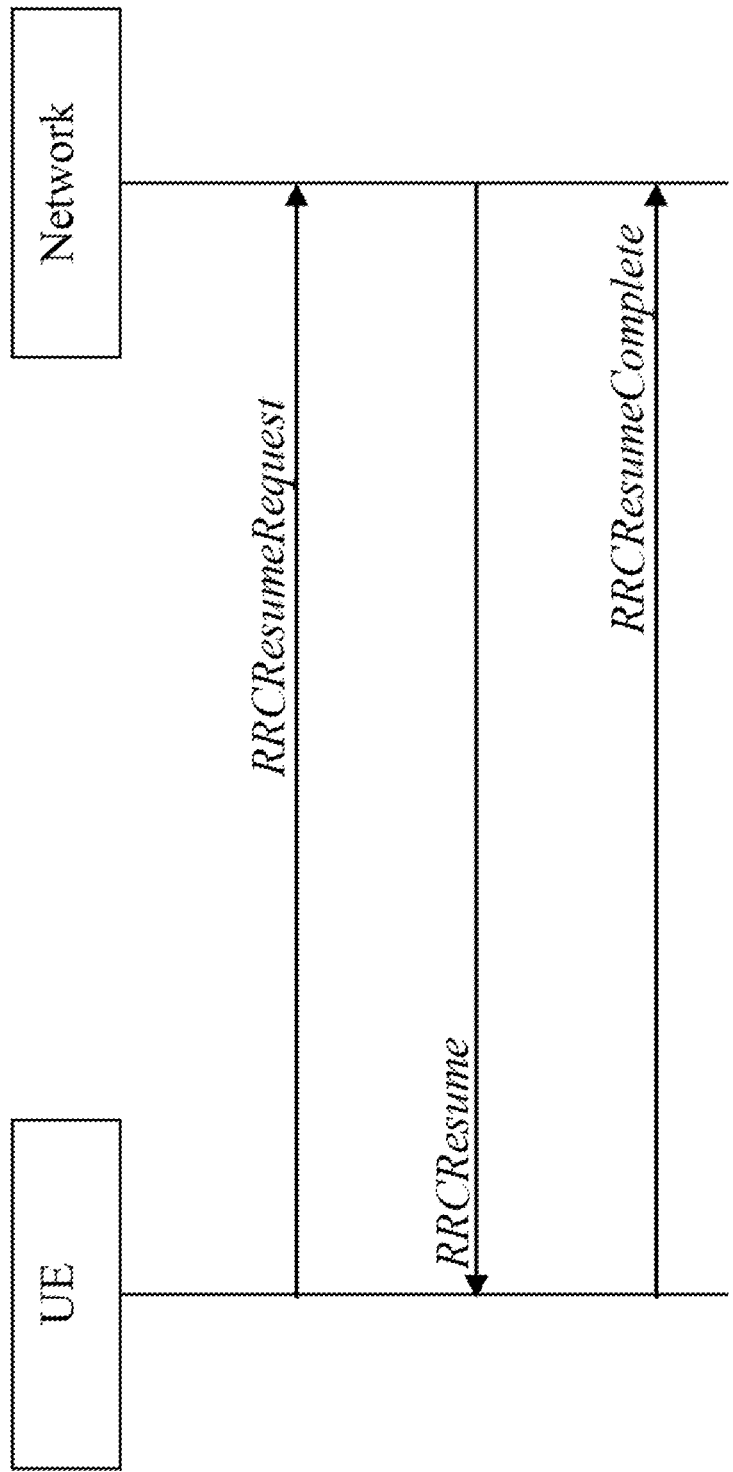
FIG. 1E illustrates a RRC resume process according to prior art.
Figure 2:
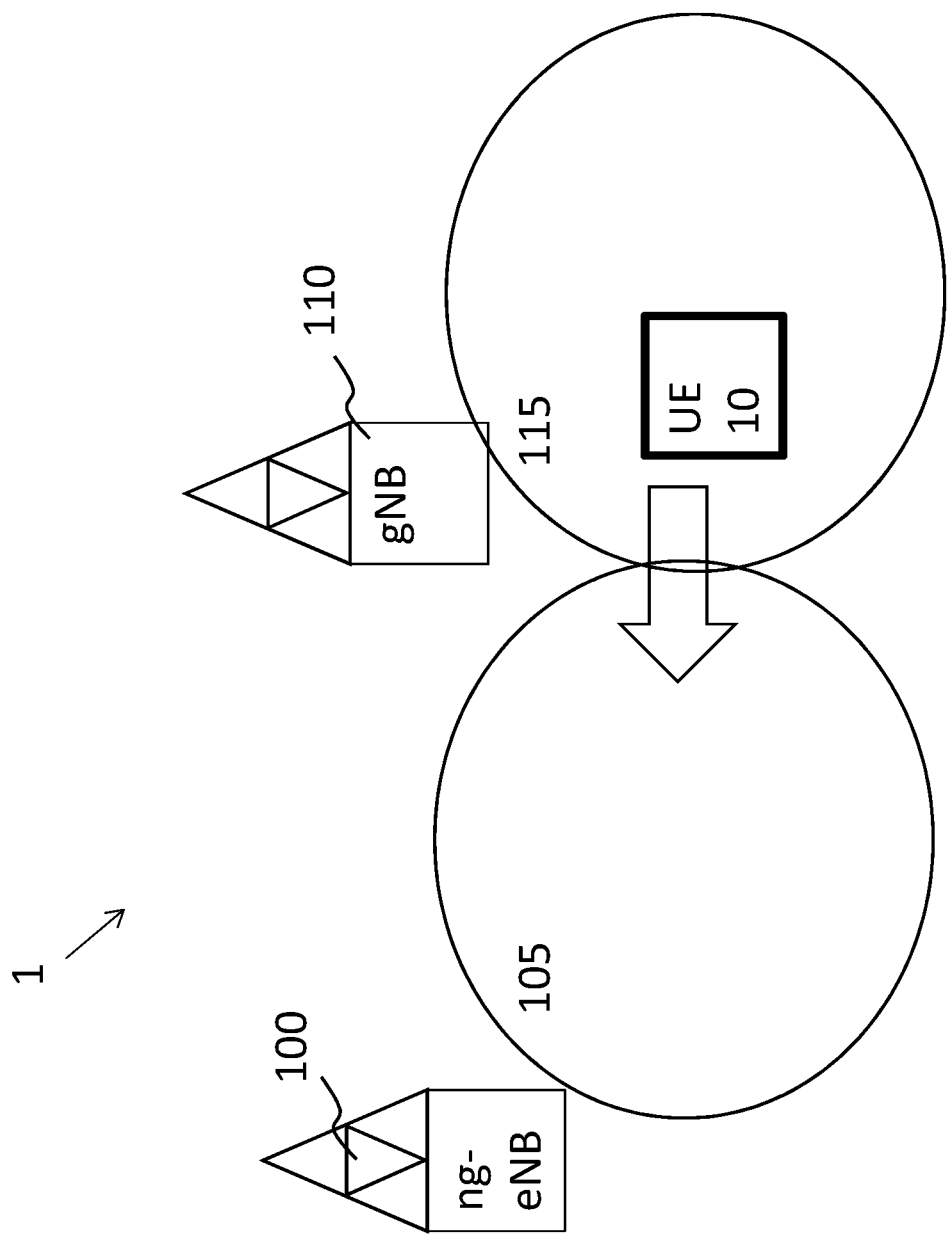
FIG. 2 shows a schematic overview depicting a wireless communication network according to embodiments herein.

FIG. 2 illustrates two different cells 105, 115, served by radio network nodes 100 and 110 respectively. A second radio network node 100 is an ng-eNB offering access through LTE air interface and a first radio network node 110 is a gNB offering access through NR air interface. The radio spectrum used in cell 105 and 115 can be the same or different. Further, the spectrum bands may be the same or different, e.g. the radio resources such as frequency and symbols may be overlapping or separated. For example, a first cell 105 may utilize bands in the 2 GHz spectrum regime whereas a second cell 115 may offer access through spectrum in other bands, like the 3.5, 5, 6, 28 or 60 GHz band.

A wireless communication network 1 comprises one or more RANs and one or more CNs. The wireless communication network 1 may use one or a number of different technologies, such as New Radio (NR), Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are also applicable in further development of the existing wireless communication systems such as e.g. WCDMA and LTE.

In the wireless communication network, UEs e.g. a UE 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises the first radio network node 110, also referred to as merely the radio network node, providing radio coverage over a geographical area, a first service area 115 or a first beam or beam group, of a first radio access technology (RAT), such as NR, LTE, Wi-Fi, WiMAX or similar. The first radio network node 110 may be a transmission and reception point, a radio network node such as a Wireless Local-Area Network (WLAN) access point or an Access Point Station (AP STA), an access node, an access controller, a radio head, a base station, e.g. a radio base station such as a NodeB, an evolved Node B (eNB, eNode B), gNodeB, a ng-eNB, a base transceiver station, a radio remote unit, an Access Point Base Station, a base station router, a transmission arrangement of a radio base station, a stand-alone access point or any other network unit or node capable of communicating with a UE within the service area served by the first radio network node 110 depending e.g. on the first radio access technology and terminology used. The first radio network node 110 may be referred to as a serving network node wherein the first service area may be referred to as a serving cell with a number of beams, and the serving network node serves and communicates with the UE 10 in form of DL transmissions to the UE 10 and UL transmissions from the UE 10. The first radio network node may for example support LTE technology.

A second radio network node 100 may further provide radio coverage over a second service area 105 or a second beam or beam group of a second radio access technology (RAT), such as NR, LTE, Wi-Fi, WiMAX or similar. The first RAT and the second RAT are different RATs. The second radio network node 100 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), gNodeB, ng-eNB, a base transceiver station, a radio remote unit, an Access Point Base Station, a base station router, a transmission arrangement of a radio base station, a stand-alone access point or any other network unit or node capable of communicating with a UE within the area served by the second radio network node 100 depending e.g. on the second radio access technology and terminology used. The second radio network node 100 may be referred to as a neighbour network node wherein the second service area 105 may be referred to as a neighbouring beam or target beam.

It should be noted that a service area may be denoted as a cell, a beam, a mobility measurement beam, a beam group or similar to define an area of radio coverage. The radio network nodes transmit RSs over respective service area. Hence, the first and second radio network nodes may transmit CSI-RSs or beam reference signals (BRS), repeatedly, in time, in a large number of different directions using as many TX-beams as deemed necessary to cover an operational area of the respective radio network node. Hence the first radio network node 110 provides radio coverage over the first service area using a first reference signal, e.g. first CSI-RS, for the first service area 115 or first beam in the wireless communication network 1. The second radio network node 100 provides radio coverage over the second service area 105 using a second reference signal, e.g. second CSI-RS, for the second service area 105 or second beam in the wireless communication network.

The UE 10, in the figure is moving from cell 115 to cell 105. Dependent on what state the UE is in different things will happen when UE enters cell 105.

If the UE 10 is in idle state such as RRC_IDLE, the UE 10 will ultimately reselect to cell 105 continue to be in idle state. If the UE 10 is in connected state such as RRC_CONNECTED, a handover of the UE 10 between cell 115 and 105 will take place, typically after the UE 10 making measurements and reporting to cell 115.

If the UE is in inactive state such as RRC_INACTIVE, similarly to RRC_IDLE, the UE 10 will reselect to cell 105.

Figure 3A:
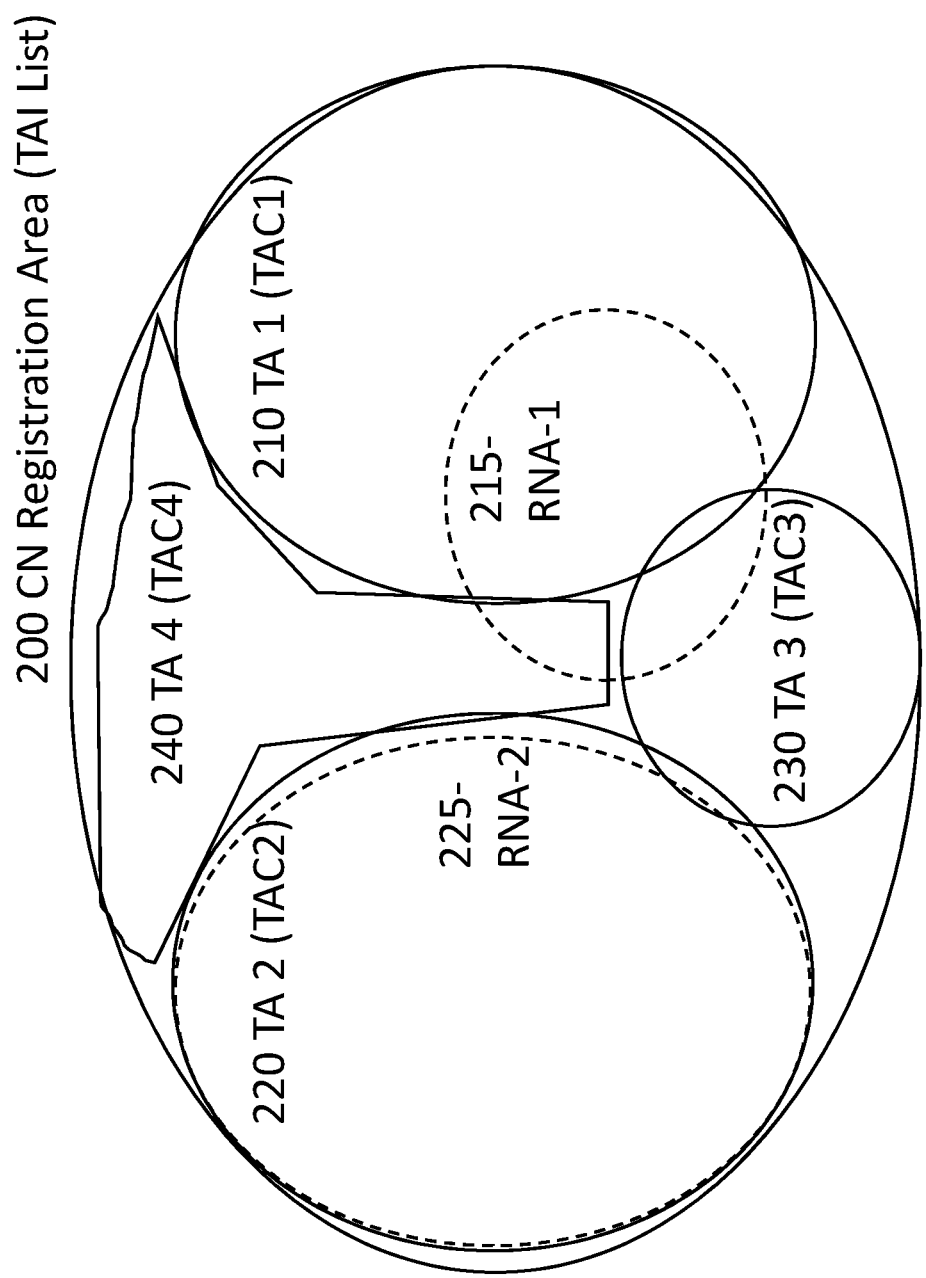
FIG. 3A illustrates the relation between an RNA and TAs.

FIG. 3A illustrates the concept of registration areas, tracking areas and RAN-based Notification Areas (RNA), according to various embodiments herein.

A UE is configured with a Core Network registration area configuration through signalling of a TAI List. This is illustrated as the outer area, 200.

The TAI list includes a list of Tracking Area Identifiers, where each Tracking Area Identifier consists of a PLMN portion and a Tracking Area Code (TAC). The TAI list identifies thus a number of tracking areas, in the figure illustrated as TA1-TA4 (210, 220, 230, 240). This is the area assigned to the certain UE to be registered in. In short, this means that as long as the UE does not leave this area, there is no need to perform any area updates to the core network due to mobility. In CM-IDLE it is still necessary to occasionally perform periodic updates, to let the network know the UE is still there.

To keep track of the UE in this way is important since the core network need to know where to page the UE in case there are incoming calls and/or connection requests so-called mobile-terminating calls.

While being in the CN Registration area 200, the UE will mostly be idle, but according to agreed cycles, it will listen to paging channels. The network will thus be able to reach the UE by transmitting pages in these paging cycles.

In RRC_INACTIVE, paging of UE's is the responsibility of the RAN. The core network will not perform pages. From the core network perspective, the UE is connected while in RRC_INACTIVE. A UE in RRC_INACTIVE shall still though perform Tracking Area Updates (TAU) when leaving the CN Registration Area, 200, also in CM-CONNECTED.

For RAN paging, it is rather the RNA that is of importance. In FIG. 3A, one such RNA is illustrated, RNA 215. The RNA 215 may consist of cells from, e.g., both TA1, TA3 and TA4, or it may consist of cells from any other area within the TAI-list. It may be only one cell or it can be several, up to all the cells constituting the complete TAI-list. In FIG. 3A, the RNA-1 is illustrated as a portion of TA1, TA3 and TA4 mainly.

Figure 3B:
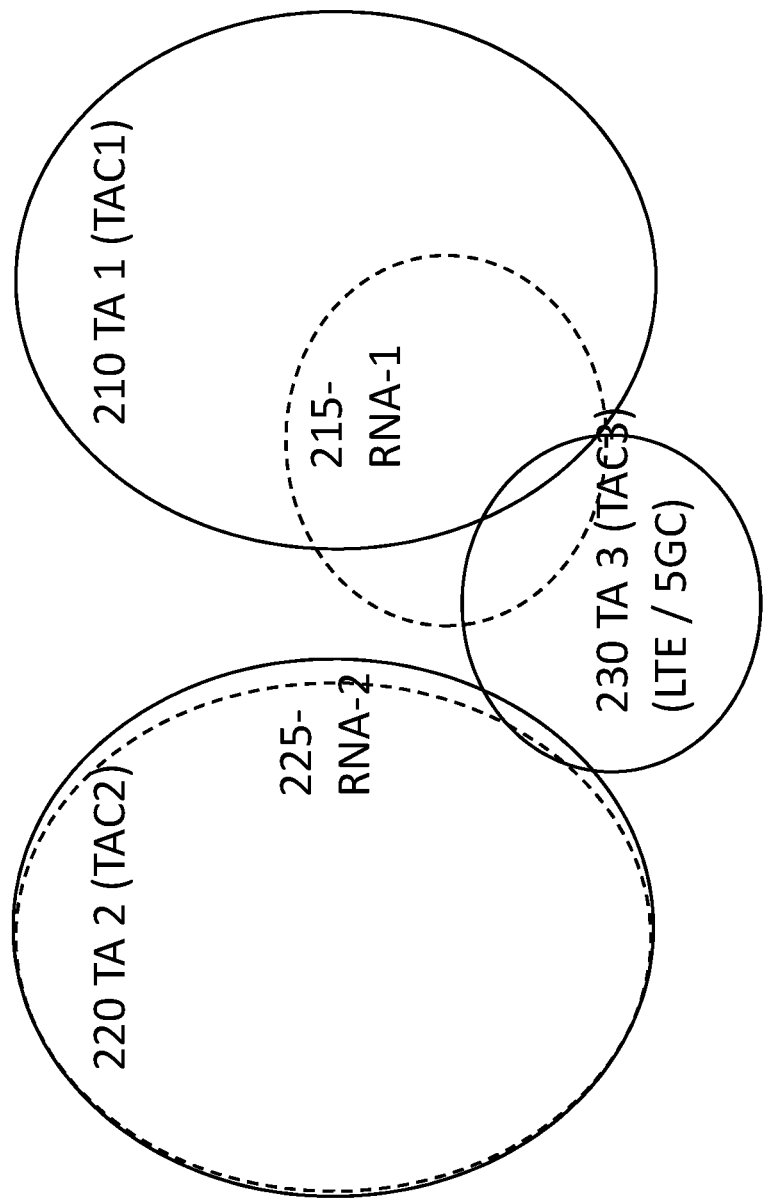
FIG. 3B illustrates inter-RAT aspects of RNA.

FIG. 3B illustrates that in the TAI-list (TA1-TA4) there can be a mix of TA's of different types of accesses i.e. RATs. This means that there can be a mix of cells using different radio accesses for communication between radio network nodes and UEs. In the example in FIG. 3B, it is illustrated that TA3 is a TA where cells deploy a LTE for connecting to the 5G Core network, whereas in the other TAs (TA1, TA2 and TA4) it is assumed that it is NR access (even though not explicitly stated). Alternatively, there may also be single TAs that includes cells of different accesses. In this example though, different TAs support different RATs. FIG. 3B illustrates that RNA-1 215 now have cells with different radio accesses included, thus also served by different access nodes. Cells in TA1 and TA4 will be served by gNBs, e.g. supporting a second RAT, whereas cells belonging to TA3 will be served by ng-eNBs, e.g. supporting a first RAT. As was stated above, there is then a need to make sure that any UE that is suspended with RNA-1 215 can resume using an I-RNTI that works in any cell in the RNA-1.

Figure 4A:
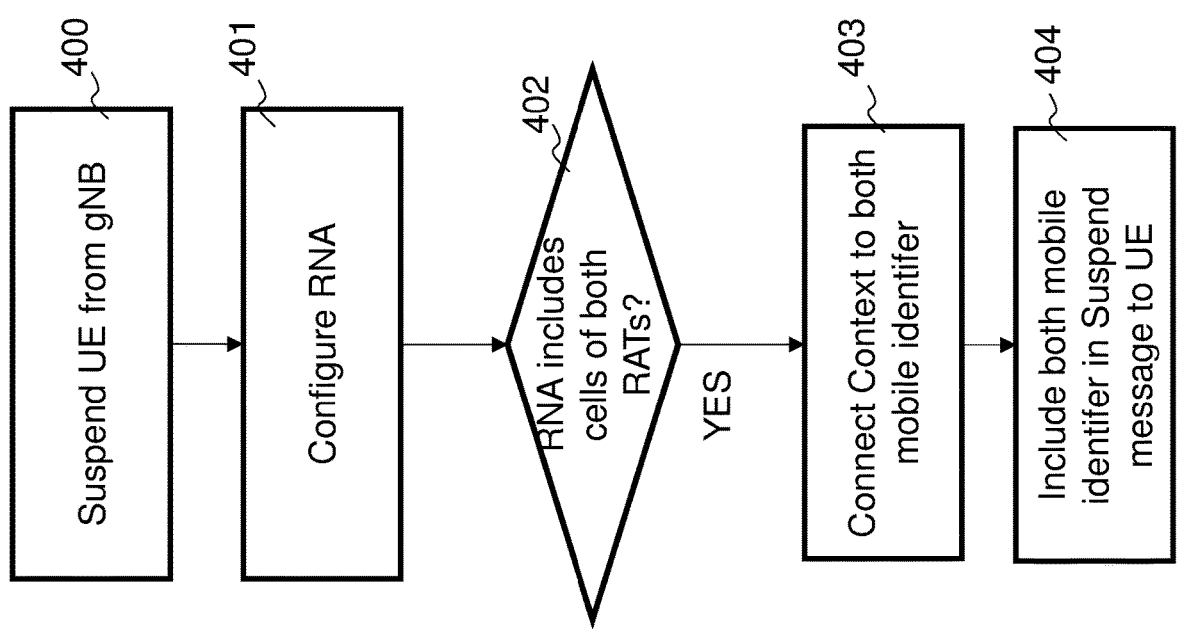
FIGS. 4A-4B illustrate flow charts according to a first embodiment herein.

FIG. 4A illustrates an example of a flowchart. The procedure starts with that the UE 10 is to be suspended i.e., transitioned from RRC_CONNECTED to RRC_INACTIVE, and the network shall send a suspend message, in step 400.

In connection to suspending the UE 10 there is a need to configure the RNA, as described above. This is action 401. The RNA may then include different types of cells and what determines exactly what cells that will be included in the RNA can be a number of factors, such as e.g., what cell the suspend procedure is executed from, what is known about the UE behavior, e.g., with respect to mobility or traffic patterns, what time of day it is, and a lot more factors. In step 401, the RNA is configured. Before suspending the UE there is a check action 402 in the first radio network node 110, if the RNA for the UE includes cells of both RATs e.g. any ng-eNB cells. If the RNA includes cells of both RATs e.g. any cells served by ng-eNB, the suspending node, e.g. the first radio network node 110, will allocate a first mobile identifier such as a first I-RNTI that is of a first length such as 40-bit in length, and allocate a second mobile identifier of a second length such as an 52-bit I-RNTI as identifier for the UE context, in action 403. In step 404 the I-RNTI is included in the suspend message sent to the UE 10.

Figure 4B:
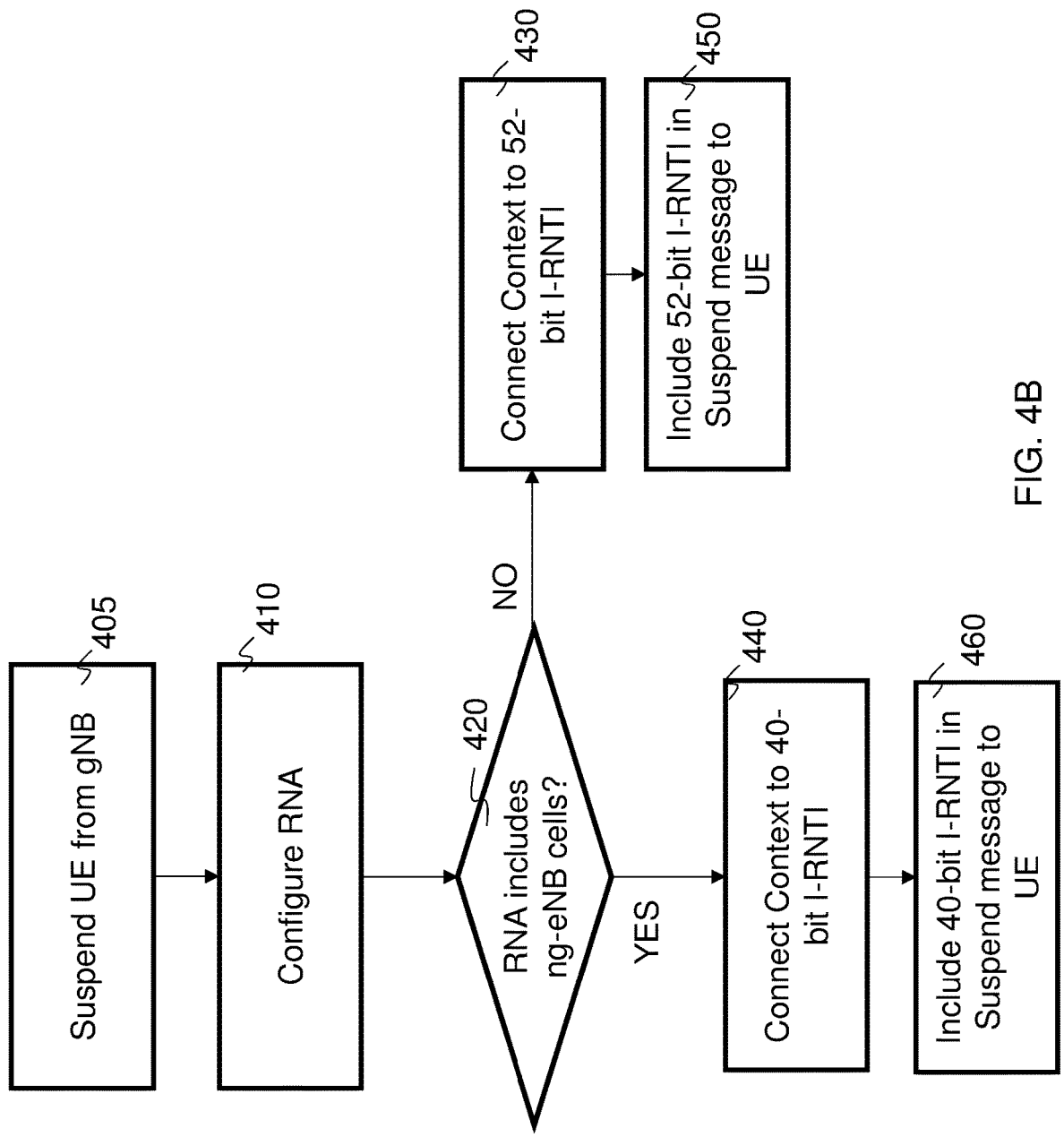

FIG. 4B illustrates a flow chart according to an embodiment.

The procedure starts with that the UE 10 is to be suspended i.e., transitioned from RRC_CONNECTED to RRC_INACTIVE, and the network shall send a suspend message, in step 405.

In connection to suspending the UE 10 there is a need to configure the RNA, as described above. This is action 410. The RNA may then include different type of cells and what determines exactly what cells that will be included in the RNA can be a number of factors, like, e.g., what cell the suspend procedure is executed from, what is known about UE behavior, e.g., with respect to mobility or traffic patterns, what time of day it is, and a lot more factors. In step 410, the RNA is configured. Before suspending the UE 10 there is a check action 420 in the first radio network node 110, if the RNA for the UE 10 includes any ng-eNB cells. If the RNA includes any cells served by ng-eNB, the suspending node, e.g. the first radio network node, 110 will allocate a first mobile identifier such as a first I-RNTI that is of a first length such as 40-bit in length, in action 440. Alternatively, if the RNA does not include any ng-eNB cells, an access node may allocate a second mobile identifier of a second length such as a 52-bit I-RNTI as identifier for the UE context, in step 430. In step 460/450 the I-RNTI is included in the suspend message sent to the UE 10.

According to the first embodiment, an I-RNTI that can be managed by the "least capable" access node will thus be selected. In a generalization of allocating identifiers, it may be that there are even further accesses that can handle identifiers of different lengths than exemplified by the first embodiment. Further, it should also be mentioned that the RNA allocated in action 410 can be identified in a number of different ways. For example, it can be identified as a list of TAs, through TAI indexes for example, or it can be identified as a list of cells. Alternatively, cells may also broadcast RANAC, a RAN Area Code, which may sort the different cells in different pre-determined RAN Areas. The RNA determined in action 410 may then be one or a set of such RANACs (together with TA) that points out a set of cells that constitute a UE's RNA.

Figure 5:
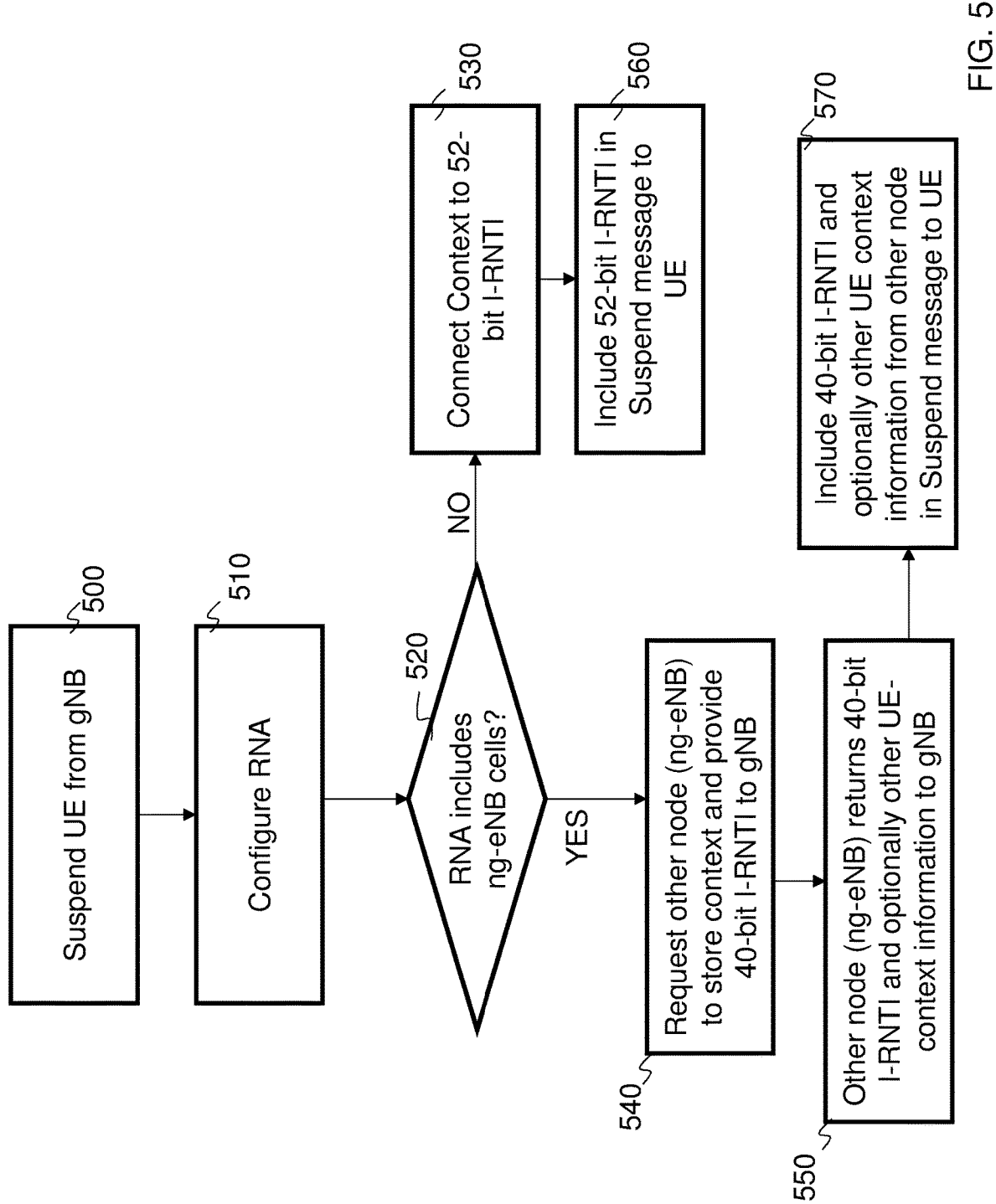
FIG. 5 illustrates a flow chart according to a second embodiment herein.

A second aspect is illustrated in FIG. 5.

The first steps in FIG. 5 are similar to the steps in FIG. 4, that there is a gNB that should suspend a UE, and that there potentially are nodes that cannot handle all context identifiers. Thus, in step 500, a UE 10 shall be suspended by a gNB, step 510, there is an RNA allocated. In step 520, there is a check if there are any cells served by ng-eNBs. If there are no cells served by ng-eNBs, (in this embodiment this means that there are only cells served by gNBs) a 52-bit I-RNTI is used and the UE context is stored in or associated with the gNB suspending the UE 10 (530, 560). This is similar to what is shown in FIG. 4. However, if there are cells served by ng-eNBs, access nodes that only manage 40-bit I-RNTIs, then in action 540, instead of simply allocating a 40-bit I-RNTI from the gNB, the gNB may request another node to instead store the UE context and allocate an I-RNTI that is associated with the UE's context. The reason for doing this is to be able to manage only 52-bit I-RNTIs and similar contexts in the gNB and as soon as there is one ng-eNB, e.g. the second radio network node 100, involved with potentially lesser capability to handle and communicate to the UE 10, then it should be this network node that handles and identifies the UE context.

In step 550, the other node, ng-eNB e.g. the second radio network node 100, returns a 40-bit I-RNTI to the gNB 110 that is suspending the UE 10, and the gNB can then communicate the 40-bit I-RNTI to the UE 10 in step 570. Optionally, there can be other information that is determined by the other node (ng-eNB, 100), that is simply forwarded by the suspending node (gNB, 110). Such other information can for example relate to the bearers or flows that are stored with the context or it can relate to security aspects that at least partially can be determined by the second radio network node 100.

An advantage with the embodiments according to FIG. 5 is that if there is one less capable node involved, it will be that node that determines and also identifies and handles/stores the context in a suspend/resume situation.

One aspect of the I-RNTI is that any node receiving a resume request may, from the I-RNTI, identify what node that holds the UE context. The receiving node shall then contact the context holding node and retrieve the information. For this to work, there is a need for a receiving node to extract a node ID from the I-RNTI. This means that the I-RNTI must be created in a way such that at least node ID is involved. For example:

I-RNTI=f( . . . , node ID, . . . )

With this reasoning, a 52-bit I-RNTI is created by a gNB using

I-RNTI=f( . . . , gNB ID, . . . ), whereas a 40-bit I-RNTI is created by an ng-eNB using I-RNTI=f( . . . , ng-eNB ID, . . . ).

Figure 6A:
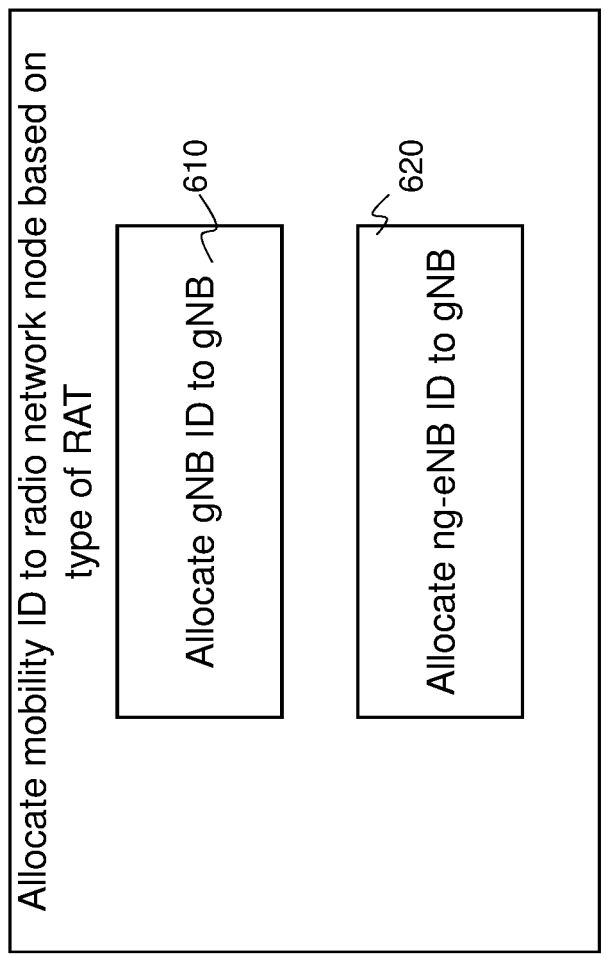
FIGS. 6A-6B illustrate flow charts according to an aspect of embodiments herein.

According to an aspect, and as illustrated in the flow chart in FIG. 6A, the gNB can however, in addition to also allocate a gNB ID, also allocate an ng-eNB ID that is in particular used for creating 40-bit I-RNTI's also from the gNB.

In configuring and setting up a gNB, it would thus, allocate a gNB ID, 610, and ng-eNB ID, 620.

In the first embodiment, gNB 110 would then, dependent on if it would form a 40-bit or a 52-bit I-RNTI, use either I-RNTI (40-bit)=f( . . . , gNB of ng-eNB format, . . . )
I-RNTI (52 bit)=f( . . . , gNB of gNB format, . . . )

Managing the IDs in a gNB in this way would create a coherent set of rules for how I-RNTI of 40-bits are created, irrespective of if they are created by an ng-eNB 100 or a gNB 110.

In yet another aspect, a 52-bit I-RNTI is always allocated by gNB. If the I-RNTI is used in connection to resume request in a gNB, the 52-bit I-RNTI will be included in the resume request message.

If, on the other hand a 52-bit I-RNTI is allocated to a UE 10 and resuming occurs in an ng-eNB, that can only handle 40 bits, then the UE 10 will truncate according to a pre-determined rule.

Figure 6B:
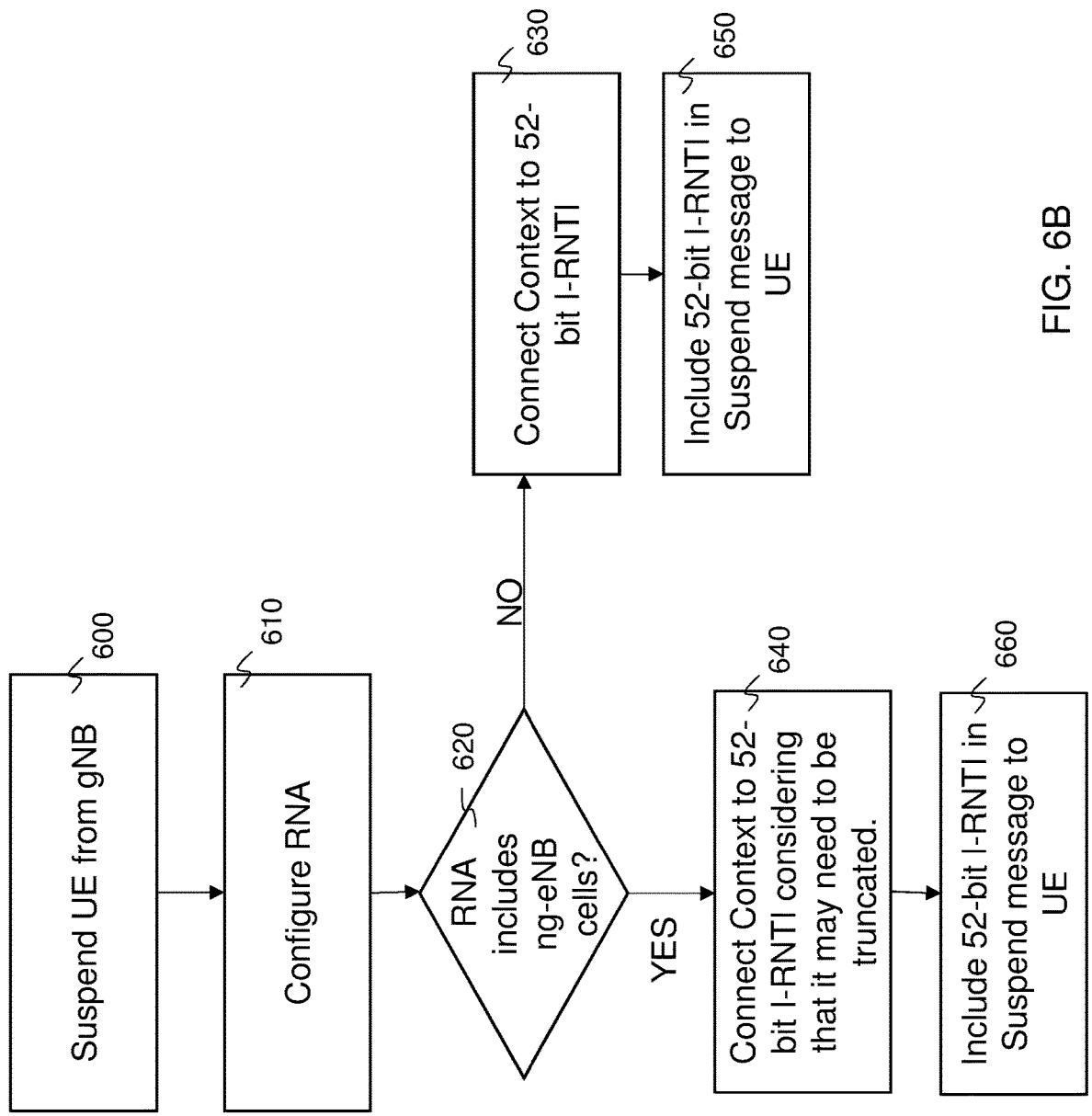

The network may know when UE 10 may use this truncation and may consider that when allocating the 52-bit I-RNTI such that when UE 10 truncates according to a pre-determined rule, the 40-bit I-RNTI that is used towards the ng-eNB will make sense. The network will know when the UE 10 may need to truncate in exactly the same way as was proposed in the embodiments above. This is illustrated in FIG. 6B. This is very similar to the embodiment of FIG. 4, except that the network will always provide a 52-bit I-RNTI in suspend message. If there is an ng-eNB included in the RNA, the I-RNTI will be allocated a number that considers that it may be truncated. This may for example be a sequence of bits that correspond to an I-RNTI as allocated by an ng-eNB and then 12 bits (that does not necessarily need to be in sequence) that can be all zeros or another pre-determined pattern that the UE 10 is instructed to truncate and not use when resuming in an ng-eNB.

Similarly, if the UE 10 is allocated a mobile identifier such as a 40-bit I-RNTI and needs to resume in a cell that is served by a gNB and that usually handle 52-bit I-RNTIs, the UE 10 may extend this 40-bit I-RNTI with a predetermined pattern of e.g. 12 bits (that does not necessarily need to be in sequence) and provide a 52-bit I-RNTI to a resume request scenario in a cell served by a gNB. This predetermined pattern will then be recognized by the receiving gNB as being "filler bits" to a 40-bit I-RNTI. The advantage of this is that resuming in a cell served by a gNB would only need to handle one format, i.e., the 52 bit format.

Figure 7A:
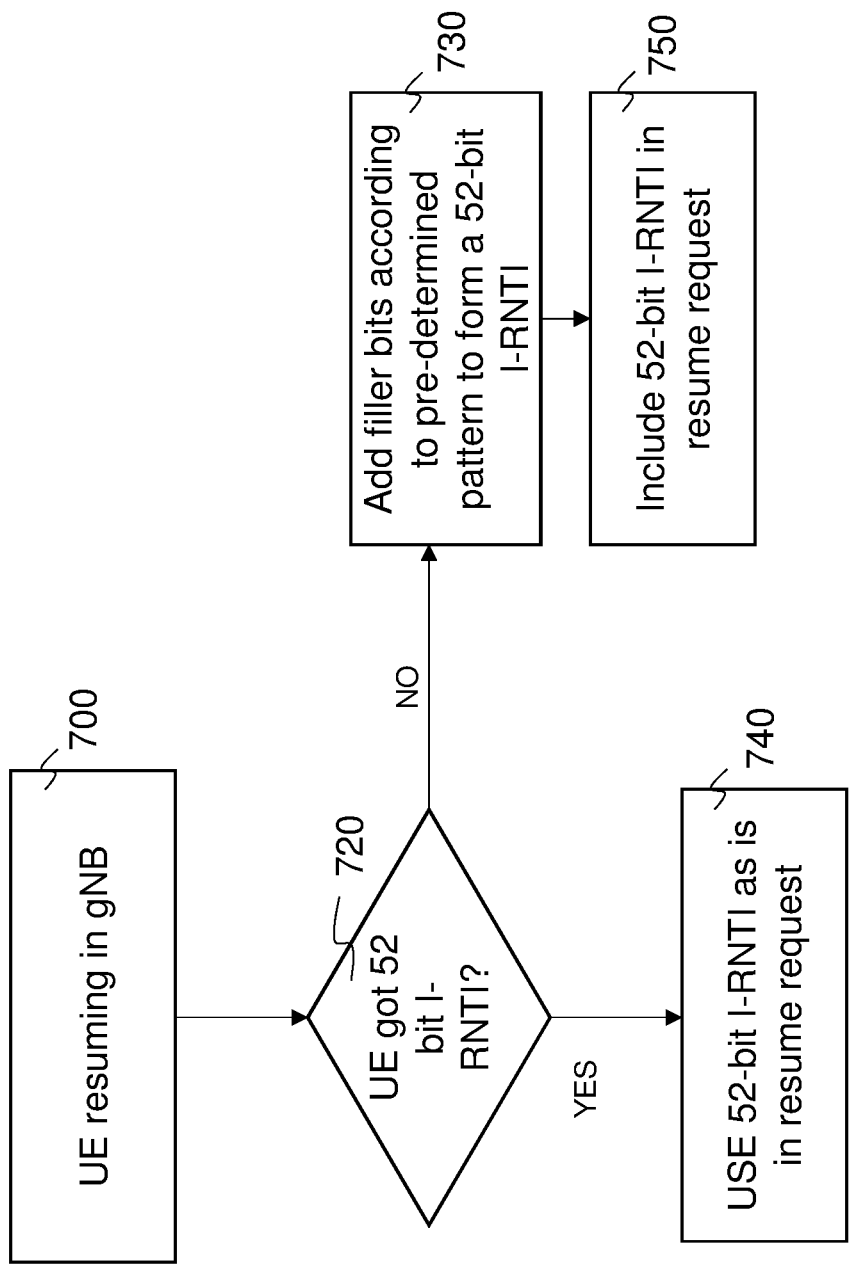
FIGS. 7A-7B illustrate flow charts according to an aspect of embodiments herein.

FIG. 7A illustrates the steps performed by the UE 10 when resuming in a gNB i.e. a radio network node of the second RAT. In a first step, there is a check, step 720, if there is a 52-bit I-RNTI allocated from suspend message, i.e. indicating a state transition, and if there is, this is used as is in step 740 in the resume request. If the message is not 52 bits (in this figure it is then supposed to be 40 bits) then filler bits may be added according to a pre-determined pattern, step 730, to form a 52-bit I-RNTI and then this I-RNTI is being used in the resume request.

Figure 7B:
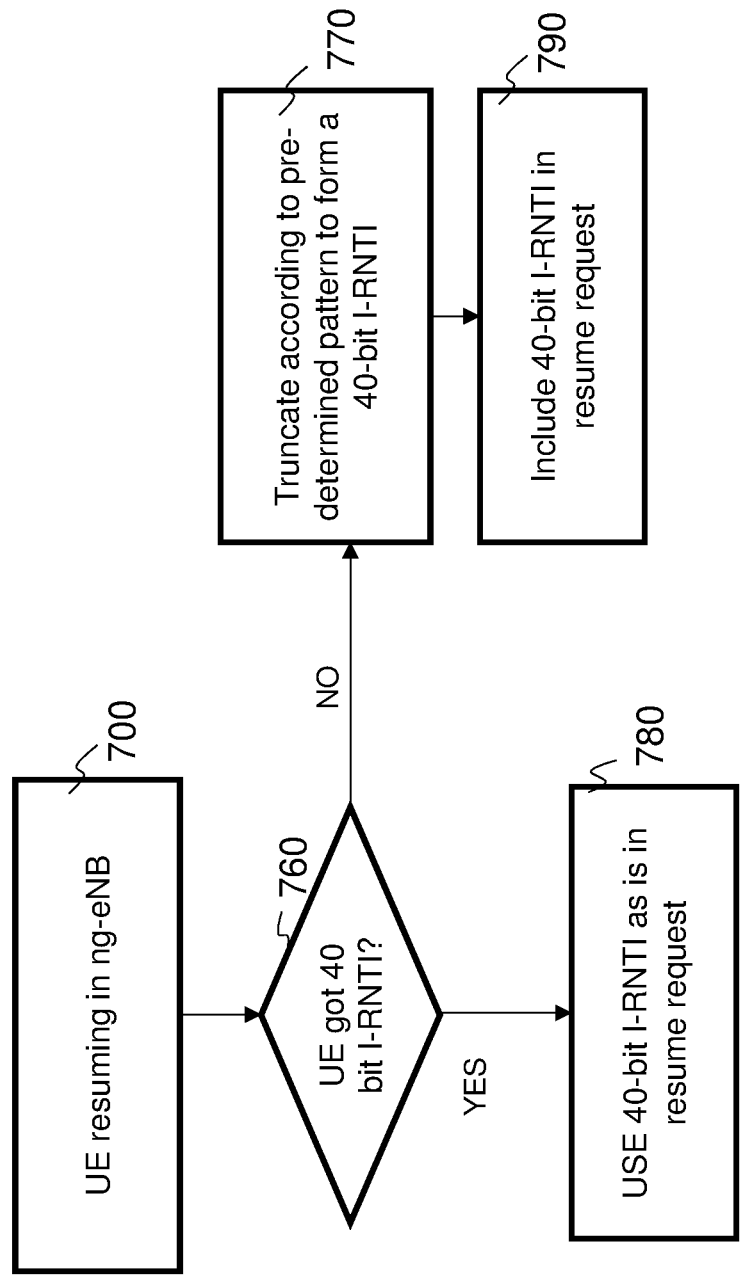

FIG. 7B illustrates a corresponding view, the steps performed by the 10 UE when resuming in an ng-eNB (that can handle only 40 bits I-RNTI).

Similarly, there is a check, step 760, if the UE 10 is allocated a 40-bit I-RNTI. This I-RNTI is then allocated from an ng-eNB supporting the first RAT such as LTE. If this is the case resuming in an ng-eNB, UE 10 will simply use the 40-bit I-RNTI it was allocated, see step 780. If the UE 10 does not have a 40-bit I-RNTI, then it is assumed in this figure that it is longer i.e., 52 bit. Then, the UE 10 may truncate this according to a pre-determined pattern to form a 40-bit I-RNTI, step 770 and then the UE 10 uses the created 40-bit I-RNTI when resuming in step 790.

Both for truncating and filling, it has been said that these measures are done according to a pre-determined pattern. This should be understood as that a UE does this in a way that is either specific or at least possible to have information about in the network side. One such way can be that the radio network node may signal to the UE a method for how truncation and filling is done. This signal may be either broadcast/system information, or dedicated signalling, e.g., in connection to suspend or in other messages.

An alternative embodiment to the embodiment described in connection to FIG. 7, when resuming in a gNB is obviously, to, instead of filling, support both a 40-bit I-RNTI and a 52-bit I-RNTI in the resume message. This would then create an option to use either or.

FIG. 8 discloses such a solution for the UE 10 that is capable of receiving a registration area configuration consisting of radio network nodes of different radio access technologies.

Action 801. The first radio network node 110 may determine to suspend the UE 10 to a different state.

Action 802. The first radio network node 110 may transmit the first and the second mobile identifier to the UE 10. Thus, the UE 10 receives from the first radio network node 110, the first mobile identifier and the second mobile identifier in a message during a transition of states of the UE 10. The first mobile identifier is of a first length and the second mobile identifier is of a second length being different than the first length.

Action 803. The UE 10 then uses the first mobile identifier for resuming to a first radio network node of a first RAT in the registration area configuration of the UE 10, and the second mobile identifier for resuming to a second radio network node of a second RAT in the registration area configuration of the UE 10.

FIG. 9A is a combined signalling scheme and flowchart according to embodiments herein.

Action 901. The radio network node e.g. the first or the second radio network node may determine to suspend the UE 10 to a different state.

Action 902. The radio network node selects length of mobile identity based on cell types in registration area configuration of the UE 10.

Action 903. The radio network node transmits the mobile identity to the UE 10.

Figure 9B:
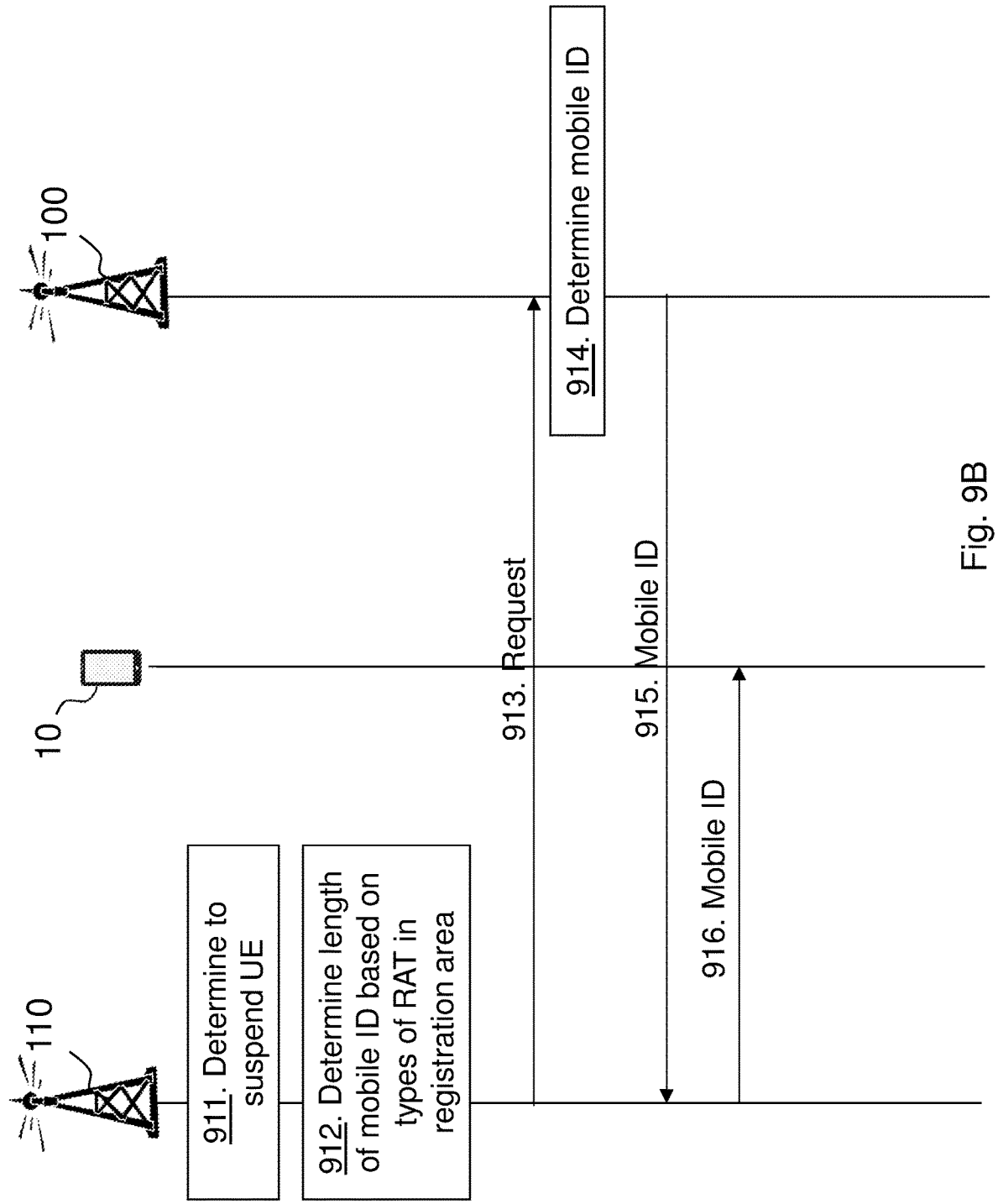

FIG. 9B is a combined signalling scheme and flowchart according to embodiments herein.

Action 911. The radio network node e.g. the first or the second radio network node may determine to suspend the UE 10 to a different state.

Action 912. The radio network node determines length of mobile identity based on cell types in registration area configuration of the UE 10.

Action 913. The radio network node transmits a request to the second radio network node 100.

Action 914. The second radio network node 100 determines mobile ID for the UE.

Action 915. The second radio network node 100 transmits the mobile ID to the first radio network node.

Action 916. The first radio network node 110 transmits the mobile ID to the UE 10.

Figure 9C:
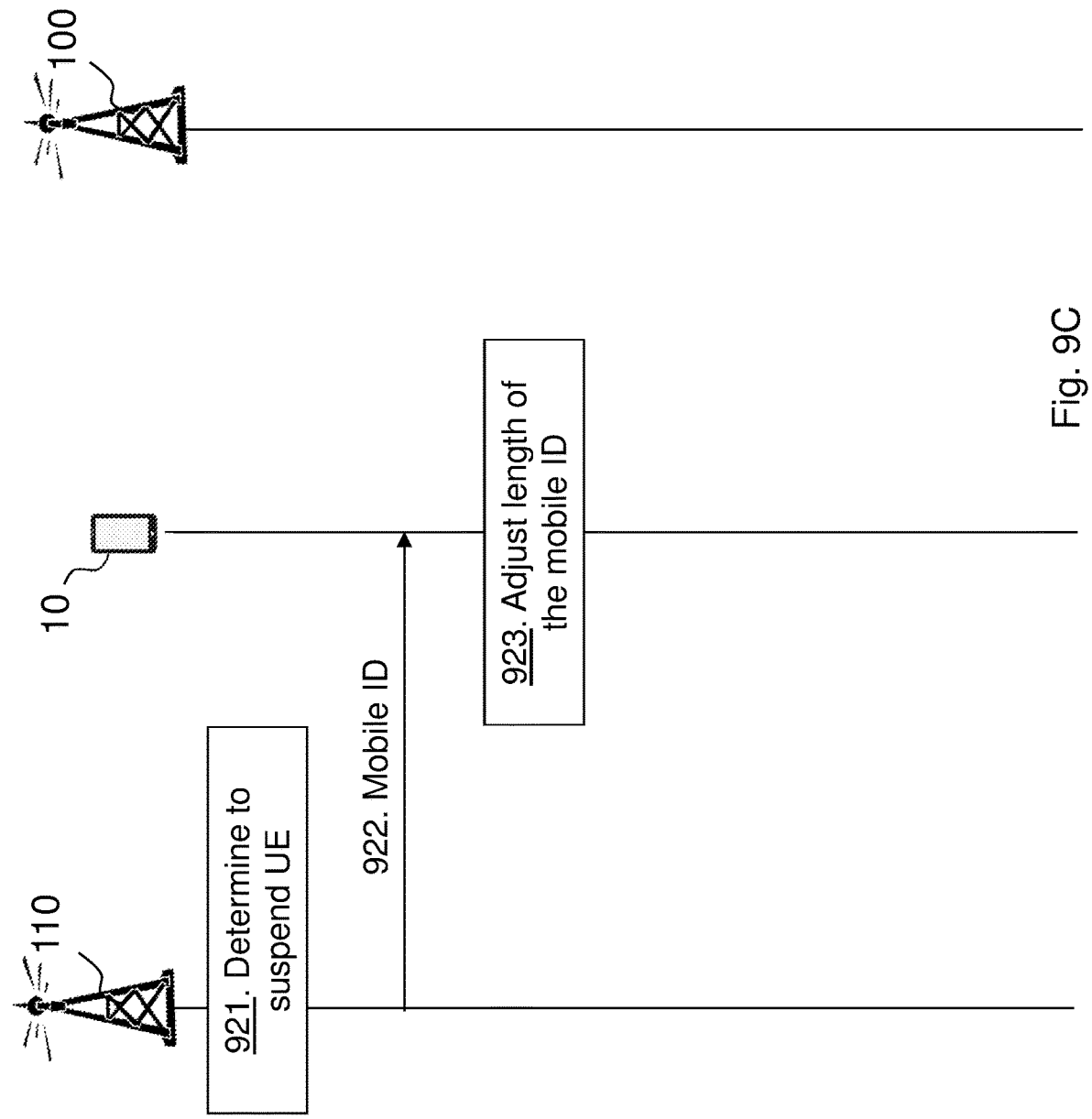

FIG. 9C is a combined signalling scheme and flowchart according to embodiments herein.

Action 921. The radio network node e.g. the first or the second radio network node may determine to suspend the UE 10 to a different state.

Action 922. The radio network node transmits the mobile identity to the UE 10.

Action 923. The radio network node adjusts length of mobile identity based on cell types in registration area configuration of the UE 10.

The method actions performed by the UE 10 for handling communication in a wireless communication network according to embodiments will now be described with reference to a flowchart depicted in FIG. 9D. The actions do not have to be taken in the order stated below, but may be taken in any suitable order. Actions performed in some embodiments are marked with dashed boxes. The UE 10 is capable of receiving the registration area configuration consisting of area identifiers associated with different radio cells of different radio access technologies.

Action 931. The UE 10 receives, from the radio network node 110, the first mobile identifier and the second mobile identifier in a message during a transition of states of the UE 10, wherein the first mobile identifier is of the first length and the second mobile identifier is of the second length being different than the first length.

Action 932. The UE 10 uses the first mobile identifier for resuming to the first radio network node of the first RAT in the registration area configuration of the UE 10, and the second mobile identifier for resuming to the second radio network node of the second RAT in the registration area configuration of the UE 10.

Figure 9E:
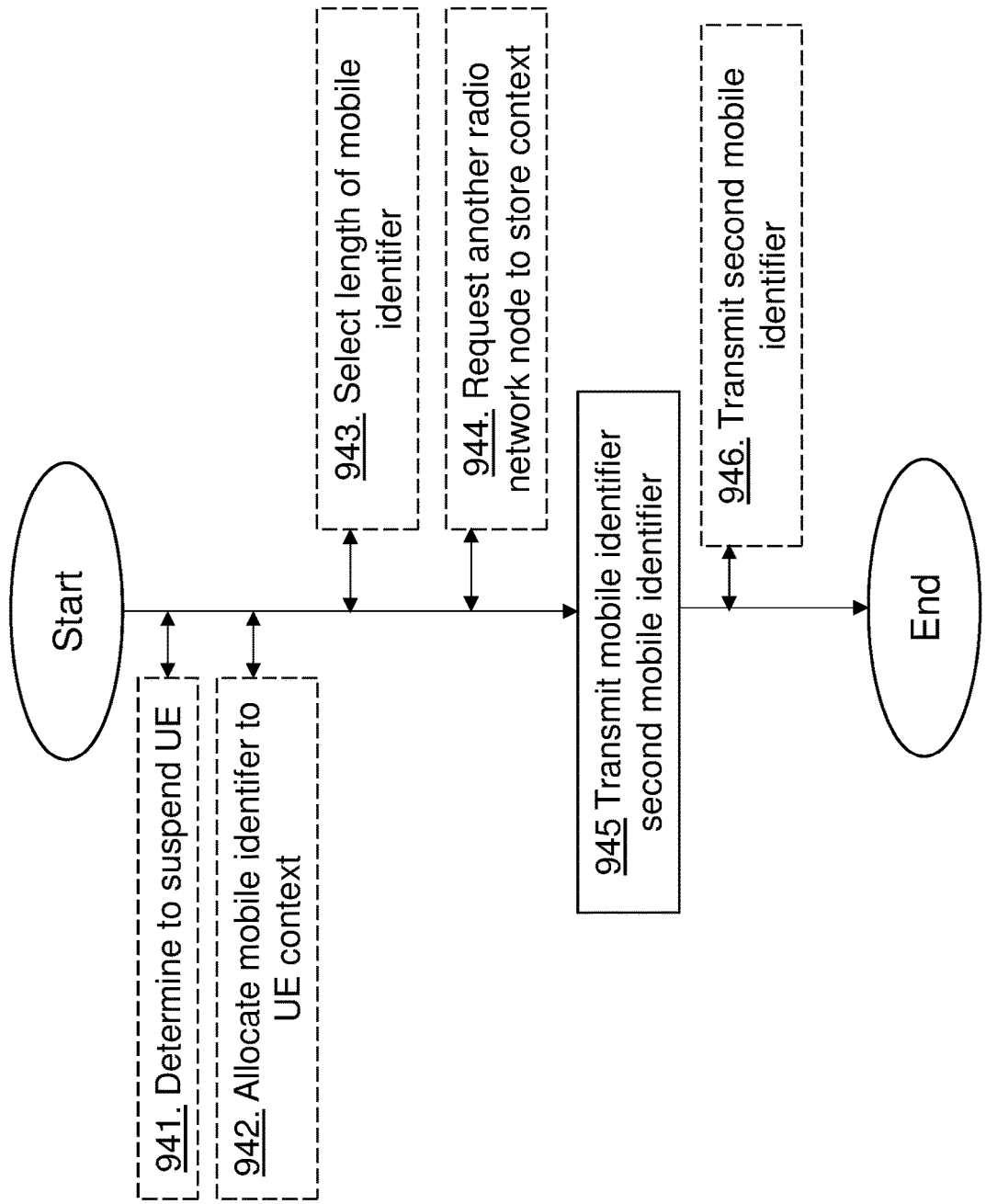

The method actions performed by the radio network node such as the first radio network node 110 for handling communication of a user equipment in a wireless communication network according to embodiments will now be described with reference to a flowchart depicted in FIG. 9E. The actions do not have to be taken in the order stated below, but may be taken in any suitable order. Actions performed in some embodiments are marked with dashed boxes.

Action 941. The radio network node may determine to suspend the UE 10 to a different state and then perform action 943.

Action 942. The radio network node may allocate the mobile identifier to the UE context which mobile identifier is used by the UE when resuming connection or access, and where the length of the allocated mobile identifier is based on type of RAT in the registration area configuration of the UE 10.

Action 943. The radio network node may select the length of the mobile identity based on types of RAT in the cells of the registration area configuration of the UE 10.

Action 944. The radio network node may request another radio network node to store context of the UE and to provide the mobile identifier to the radio network node.

Action 945. The radio network node transmits, to the UE 10, the mobile identifier in a message during a transition of states of the UE, wherein the length of the mobile identifier is based on one or more types of RATs of cells in a registration area configuration of the UE 10, and wherein the mobile identifier is associated with a UE context of the UE 10. Associated with the UE context may mean that the mobile identifier identifies the radio network node where the UE context is stored, enabling the retrieval of the UE context upon mobility e.g. is pointing to UE context to retrieve the UE context upon handover. The registration area configuration may define an area in which the UE 10 moves around without updating the radio network node on its position. The radio network nodes and cell types allow access to a 5G core network.

Action 946. The radio network node may further transmit to the UE 10, the second mobile identifier in the message wherein the second mobile identifier is of a second length and the mobile identifier is of a first length being different than the second length; and wherein the second mobile identifier is associated with a radio network node of a second RAT and the mobile identifier, i.e. the first mobile identifier is associated with another radio network node of a first RAT.

The method actions performed by the UE 10 for handling communication in a wireless communication network according to embodiments will now be described with reference to a flowchart depicted in FIG. 9F. The actions do not have to be taken in the order stated below, but may be taken in any suitable order.

Action 951. The UE 10 may in some embodiments receive from the radio network node the mobile identifier in a message during a transition of states of the UE 10, wherein the mobile identifier is associated with a UE context of the UE 10 and is of a length.

Action 952. The UE 10 may then adjust the length of the mobile identifier based on type of RAT in a registration area configuration of the UE. E.g. the UE 10 may when resuming use shorter or longer mobile identifier than the mobile identifier received. Shorter would mean truncating, and longer would mean padding. When the UE 10 is in another RAT and monitor paging messages the UE 10 may use a short or longer mobile identifier than the mobile identifier it received. The UE 10 may thus adjust the mobile identifier by using a subset of the mobile identifier in one RAT and the whole mobile identifier in another RAT.

Figure 10:
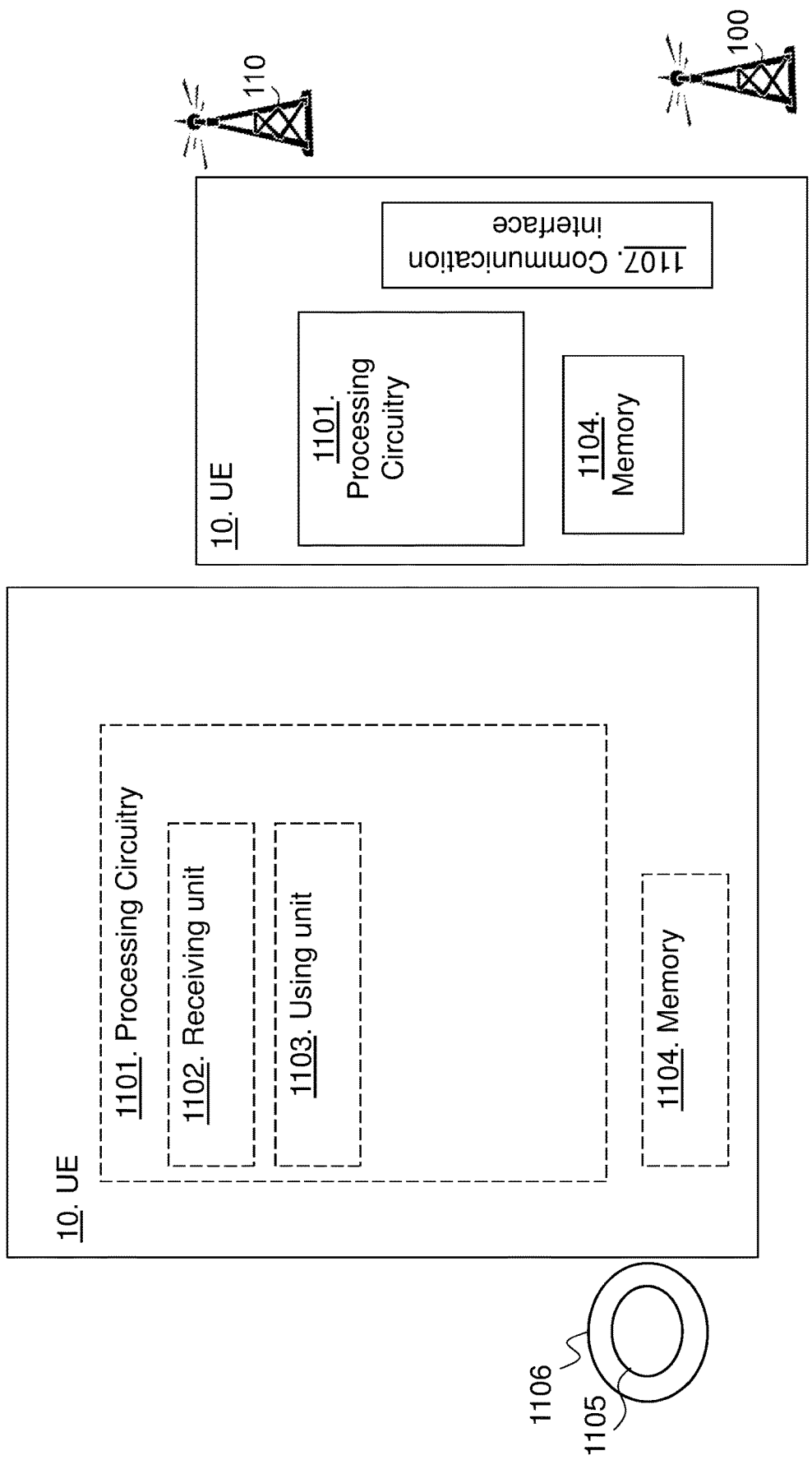
FIG. 10 is a block diagram depicting a UE according to embodiments herein.

FIG. 10 is a block diagram depicting two embodiments of the UE 10 according to embodiments herein for handling communication of the UE 10 in the wireless communication network 1, wherein the wireless communication network 1 may comprise the radio network node such as the first radio network node 110 being configured to serve the UE 10. The wireless communication network 1 may further comprise the second radio network node 100. The UE 10 is capable of receiving the registration area configuration consisting of area identifiers associated with different radio cells of different radio access technologies.

The UE 10 may comprise processing circuitry 1101, e.g. one or more processors, configured to perform the methods herein.

The UE 10 may comprise a receiving unit 1102 such as a receiver, a transceiver or similar. The UE 10, the processing circuitry 1101, and/or the receiving unit 1102 is configured to receive, from the radio network node 110, the first mobile identifier and the second mobile identifier in a message during a transition of states of the UE. The first mobile identifier is of a first length and the second mobile identifier is of a second length being different than the first length. The UE 10, the processing circuitry 1101, and/or the receiving unit 1102 may be configured to receive, from the radio network node 110, a mobile identifier such as the first mobile identifier in a message during a transition of states of the UE, wherein the mobile identifier is associated with a UE context of the UE and is of a length.

The UE 10 may comprise a using unit 1103. The UE 10, the processing circuitry 1101, and/or the using unit 1103 is configured to use the first mobile identifier for resuming to the first radio network node of the first RAT in the registration area configuration of the UE, and the second mobile identifier for resuming to the second radio network node of the second RAT in the registration area configuration of the UE. The UE 10, the processing circuitry 1101, and/or the using unit 1103 may be configured to adjust the length of the mobile identifier based on type of RAT in a registration area configuration of the UE.

The UE 10 further comprises a memory 1104. The memory comprises one or more units to be used to store data on, such as priorities, rules, RNA, mobile identifier, parameters, applications to perform the methods disclosed herein when being executed, and similar. The UE 10 may further comprise a communication interface 1107 comprising e.g. a transmitter, a transceiver, a receiver, and/or one or more antennas.

The methods according to the embodiments described herein for the UE 10 are respectively implemented by means of e.g. a computer program 1105 or a computer program product, comprising instructions, i.e., software code portions, which, when executed on at least one processor, cause the at least one processor to carry out the actions described herein, as performed by the UE 10. The computer program 1105 may be stored on a computer-readable storage medium 1106, e.g. a disc, a universal serial bus (USB) stick or similar. The computer-readable storage medium 1106, having stored thereon the computer program, may comprise the instructions which, when executed on at least one processor, cause the at least one processor to carry out the actions described herein, as performed by the UE 10. In some embodiments, the computer-readable storage medium may be a non-transitory computer-readable storage medium or a transitory computer-readable storage medium.

Thus, the UE 10 may comprise the processing circuitry and the memory, said memory comprising instructions executable by said processing circuitry whereby said UE is operative to perform the methods herein.

Figure 11:
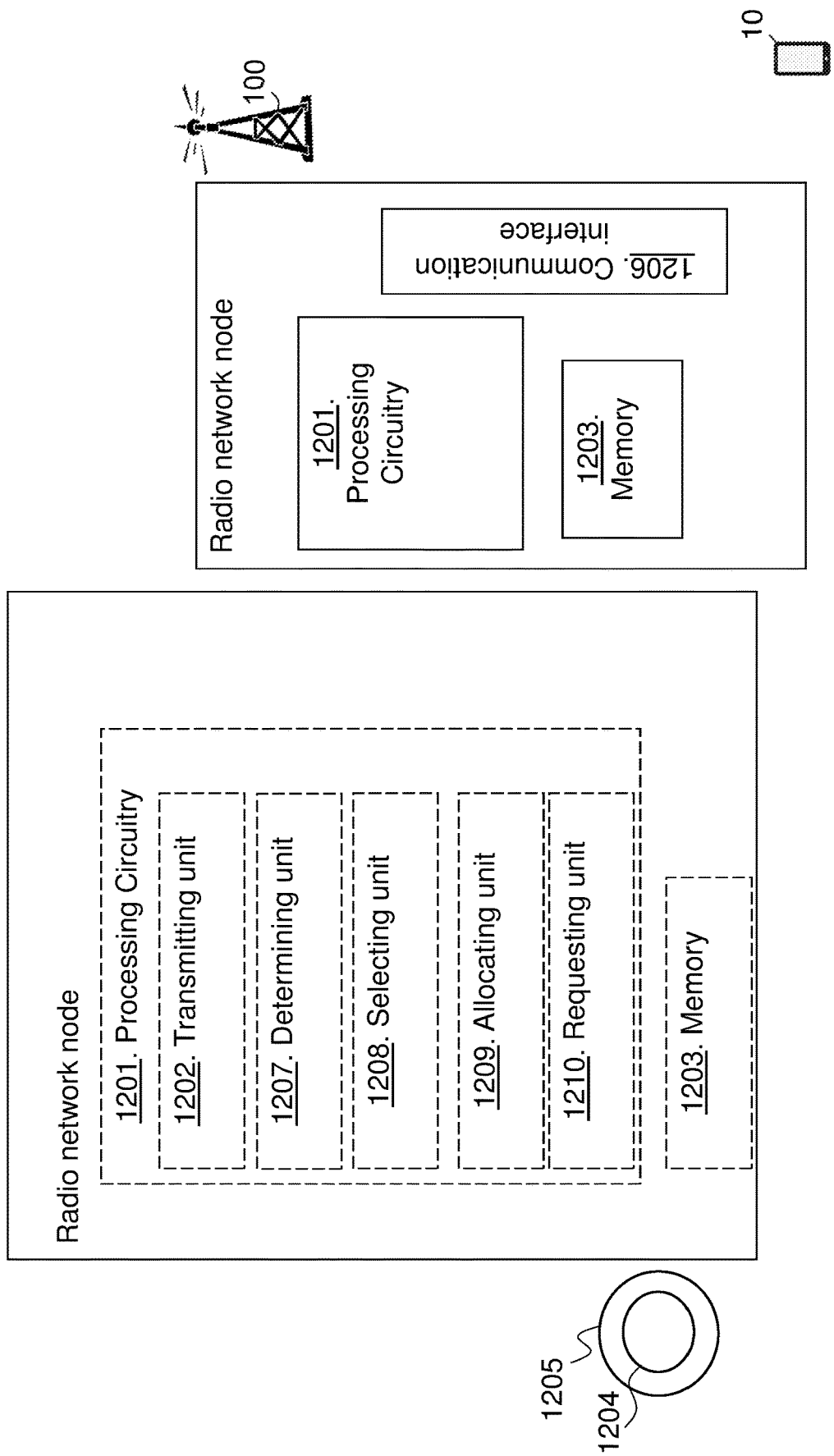
FIG. 11 is a block diagram depicting a radio network node according to embodiments herein.

FIG. 11 is a block diagram depicting two embodiments of the radio network node exemplified as the first radio network node 110 or the second radio network node 100 according to embodiments herein for handling communication of the UE 10 in the wireless communication network. The first radio network node 110 may be configured to serve the UE 10 and the wireless communication network 1 may further comprise the second radio network node 100.

The radio network node may comprise processing circuitry 1201, e.g. one or more processors, configured to perform the methods herein.

The radio network node may comprise a transmitting unit 1202 such as a transmitter, a transceiver or similar. The radio network node, the processing circuitry 1201 and/or the transmitting unit 1202 is configured to transmit, to the UE 10, the mobile identifier in the message during the transition of states of the UE, wherein the length of the mobile identifier is based on one or more types of RATs of cells in the registration area configuration of the UE 10, and wherein the mobile identifier is associated with the UE context of the UE 10. Associated with the UE context may mean that the mobile identifier identifies the radio network node where the UE context is stored, enabling the retrieval of the UE context upon mobility. The registration area configuration may be an area in which the UE moves around without updating the radio network node on its position. Both the radio network nodes and cell types may allow access to a 5G core network.

The radio network node may comprise a determining unit 1207. The radio network node, the processing circuitry and/or the determining unit 1207 may be configured to determine to suspend the UE 10 to a different state and then transmitting the mobile identifier to the UE 10.

The radio network node may comprise a selecting unit 1208. The radio network node, the processing circuitry and/or the selecting unit 1208 may be configured to select the length of mobile identity based on types of RAT in the cells of the registration area configuration of the UE.

The radio network node may comprise an allocating unit 1209. The radio network node 110, the processing circuitry 1201 and/or the allocating unit 1209 may be configured to allocate the mobile identifier to the UE context which mobile identifier is used by the UE when resuming connection or access, and where the length of the allocated mobile identifier is based on type of RAT in the registration area configuration of the UE.

The radio network node may comprise a requesting unit 1210. The radio network node 110, the processing circuitry 1201 and/or the requesting unit 1210 may be configured to request another radio network node to store context of the UE and to provide the mobile identifier to the radio network node.

The radio network node, the processing circuitry 1201 and/or the transmitting unit 1202 may be configured to transmit, to the UE 10, the second mobile identifier in the message wherein the second mobile identifier is of the second length and the (first) mobile identifier is of the first length being different than the second length; and wherein the second mobile identifier is associated with the radio network node of the second RAT and the mobile identifier is associated with another radio network node of the first RAT.

The radio network node 110 further comprises a memory 1203. The memory comprises one or more units to be used to store data on, such as RS configurations, configuration data, priorities, carrier frequencies, registration areas, strengths or qualities, parameters, applications to perform the methods disclosed herein when being executed, and similar. The radio network node 110 may further comprise a communication interface 1206 comprising e.g. a transmitter, a transceiver, a receiver, and/or one or more antennas.

The methods according to the embodiments described herein for the radio network node 110 are respectively implemented by means of e.g. a computer program 1204 or a computer program product, comprising instructions, i.e., software code portions, which, when executed on at least one processor, cause the at least one processor to carry out the actions described herein, as performed by the first radio network node 110. The computer program 1204 may be stored on a computer-readable storage medium 1205, e.g. a disc, a USB stick, or similar. The computer-readable storage medium 1205, having stored thereon the computer program, may comprise the instructions which, when executed on at least one processor, cause the at least one processor to carry out the actions described herein, as performed by the first radio network node 110. In some embodiments, the computer-readable storage medium may be a non-transitory computer-readable storage medium or a transitory computer-readable storage medium.

Thus, the first radio network node 110 may comprise the processing circuitry and the memory, said memory comprising instructions executable by said processing circuitry whereby said radio network node is operative to perform the methods herein.

In some embodiments a more general term "radio network node" is used and it can correspond to any type of radio network node or any network node, which communicates with a UE and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) node etc.

It should be noted that in a general scenario the term "radio network node" can be substituted with "transmission and reception point". It is allowed to make a distinction between the transmission reception points (TRPs), typically based on RSs or different synchronization signals and BRSs transmitted. Several TRPs may be logically connected to the same radio network node but if they are geographically separated, or are pointing in different propagation directions, the TRPs will be subject to the same issues as different radio network nodes. In subsequent sections, the terms "radio network node" and "TRP" can be thought of as interchangeable.

It should further be noted that a wireless communication network may be virtually network sliced into a number of Network (and/or RAN) slices, each Network (and/or RAN) slice supports one or more type of UEs and/or one or more type of services i.e. each network slice supports a different set of functionalities. Network slicing introduces the possibility that the Network (and/or RAN) slices are used for different services and use cases and these services and use cases may introduce differences in the functionality supported in the different network slices. Each Network (and/or RAN) slice may comprise one or more network nodes or elements of network nodes providing the services/functionalities for the respective network slice. Each Network (and/or RAN) slice may comprise a network node such as a RAN node and/or a core network node.

In some embodiments the non-limiting term UE or wireless device is used and it refers to any type of UE communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE Frequency Division Duplex/Time Division Duplex (FDD/TDD), WCDMA/HSPA, GSM/GERAN, Wi Fi, WLAN, CDMA2000 etc.

Antenna node is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, and the memory may comprise read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 12:
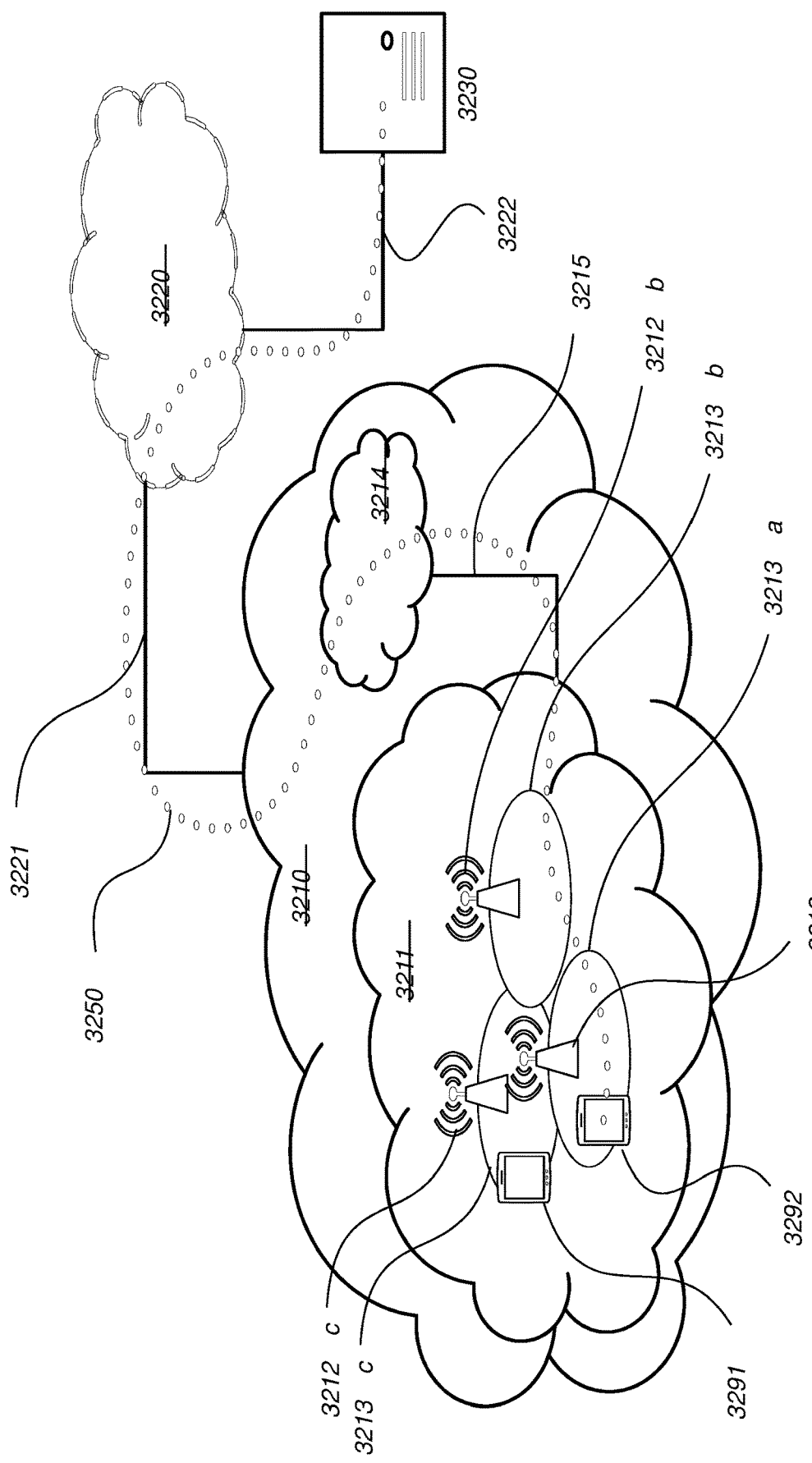
FIG. 12 shows a telecommunication network connected via an intermediate network to a host computer in accordance with some embodiments.

FIG. 12: Telecommunication Network Connected Via an Intermediate Network to a Host Computer in Accordance with Some Embodiments With reference to FIG. 12, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the radio network node 110 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the UE 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 12 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signalling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 13:
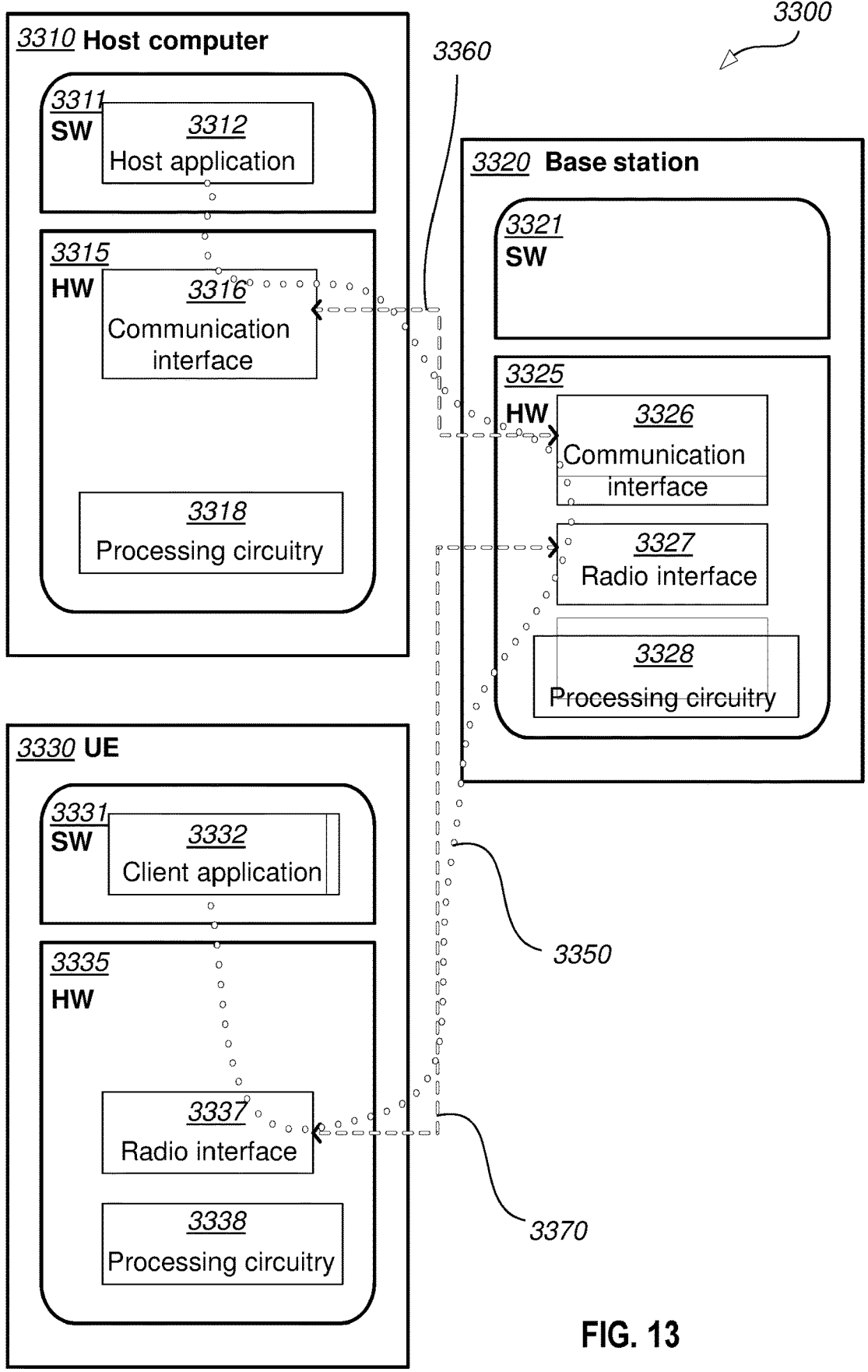
FIG. 13 shows a host computer communicating via a base station with a user equipment over a partially wireless connection in accordance with some embodiments.

FIG. 13: Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 13. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 13) served by base station 3320. Communication interface 3326 may be configured to facilitate connection 3360 to host computer 3310. Connection 3360 may be direct or it may pass through a core network (not shown in FIG. 13) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 13 may be similar or identical to host computer 3230, one of base stations 3212a, 3212b, 3212c and one of UEs 3291, 3292 of FIG. 12, respectively. This is to say, the inner workings of these entities may be as shown in FIG. 13 and independently, the surrounding network topology may be that of FIG. 12.

In FIG. 13, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the mobility since e.g. I-RNTI may be understood by both RATs and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signalling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 14, 15:
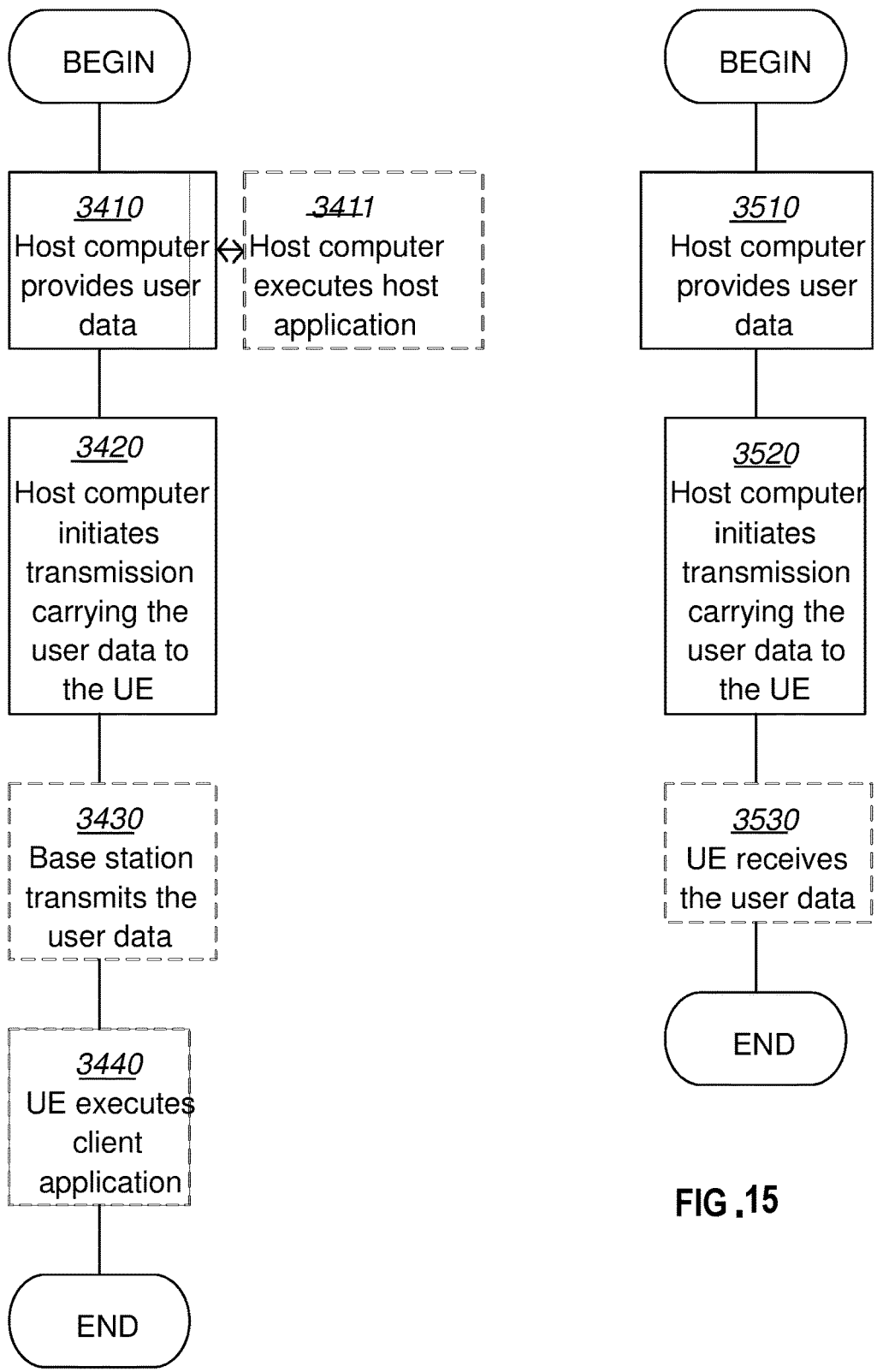
FIG. 14 shows methods implemented in a communication system including a host computer, a base station and a user equipment in accordance with some embodiments.
FIG. 15 shows methods implemented in a communication system including a host computer, a base station and a user equipment in accordance with some embodiments.

FIG. 14: Methods Implemented in a Communication System Including a Host Computer, a Base Station and a User Equipment in Accordance with Some Embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 3410, the host computer provides user data. In sub step 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 15: Methods Implemented in a Communication System Including a Host Computer, a Base Station and a User Equipment in Accordance with Some Embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 3510 of the method, the host computer provides user data. In an optional sub step (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 3610 (which may be optional), the UE receives input data provided by the host computer. Additionally or alternatively, in step 3620, the UE provides user data. In sub step 3621 (which may be optional) of step 3620, the UE provides the user data by executing a client application. In sub step 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in sub step 3630 (which may be optional), transmission of the user data to the host computer. In step 3640 of the method, the host computer receives the user data transmitted from the UE, in accordance with the teachings of the embodiments described throughout this disclosure.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment, UE, in a wireless communication network, the method comprising:
receiving a registration area configuration including area identifiers associated with different radio cells of different radio access technologies, RATs;
receiving, from a radio network node, a message during a transition of states of the UE, the message including a first mobile identifier having a first length;
responsive to receiving the message, generating a second mobile identifier by adjusting the first length of the first mobile identifier based on a type of a RAT in the registration area configuration of the UE; and
using the second mobile identifier to resume to a second radio network node of the RAT in the registration area configuration of the UE.

2. A method performed by a radio network node in a wireless communication network, the method comprising:
transmitting, to a user equipment, UE, a message during a transition of states of the UE, the message including a first mobile identifier having a first length; and
transmitting a second message to the UE, wherein the second message including a second mobile identifier having a second length that is different than the first length, the second mobile identifier including a portion of the first mobile identifier and the second length indicating a RAT in a registration area of the UE,
wherein the first mobile identifier and the second mobile identifier are associated with a UE context of the UE.

3. The method of claim 2, comprising:
determining to suspend the UE to a different state,
wherein transmitting the message comprises, responsive to determining to suspend the UE to the different state, transmitting the message to the UE.

4. The method of claim 2, further comprising:
selecting the first length of the first mobile identifier based on a type of the RAT in the registration area configuration of the UE.

5. The method of claim 2, wherein the first mobile identifier identifies where the UE context is stored.

6. The method of claim 2, wherein the registration area configuration is an area in which the UE moves around without updating the radio network node on its position.

7. The method of claim 2, wherein both the radio network node and a type of the RAT allow access to a $5^{th}$ generation, 5G, core network.

8. The method of claim 2, further comprising:
transmitting a request message to a second radio network node, the request message instructing the second radio network node to store context of the UE and to provide the first mobile identifier to the radio network node.

9. A user equipment, UE, in a wireless communication network, the UE comprising:
processing circuitry; and
memory coupled to the processing circuitry and having instructions stored therein that are executable by the processing circuitry to cause the UE to perform operations, the operations comprising:
receiving a registration area configuration including area identifiers associated with different radio cells of different radio access technologies, RATs;
receiving, from a radio network node, a message during a transition of states of the UE, the message including a first mobile identifier having a first length;
responsive to receiving the message, generating a second mobile identifier by adjusting the first length of the first mobile identifier based on a type of a RAT in the registration area configuration of the UE; and
using the second mobile identifier to resume to a second radio network node of the RAT in the registration area configuration of the UE.

10. A radio network node in a wireless communication network, the radio network comprising:
processing circuitry; and
memory coupled to the processing circuitry and having instructions stored therein that are executable by the processing circuitry to cause the radio network node to perform operations, the operations comprising:
transmitting to a user equipment, UE, a message during a transition of states of the UE, the message including a first mobile identifier having a first length; and
transmitting a second message to the UE, wherein the second message including a second mobile identifier having a second length that is different than the first length, the second mobile identifier including a portion of the first mobile identifier and the second length indicating a RAT in a registration area of the UE, wherein the first mobile identifier and the second mobile identifier are associated with a UE context of the UE.

11. The radio network node of claim 10, the operations further comprising:

determining to suspend the UE to a different state, wherein transmitting the message comprises, responsive to determining to suspend the UE to the different state, transmitting the message to the UE.

12. The radio network node of claim 10, the operations further comprising:

selecting the first length of the first mobile identifier based on a type of the RAT in the registration area configuration of the UE.

13. The radio network node of claim 10, wherein the first mobile identifier identifies where the UE context is stored.

14. The radio network node of claim 10, wherein the registration area configuration is an area in which the UE moves around without updating the radio network node on its position.

15. The radio network node of claim 10, wherein both the radio network node and the type of the RAT allow access to a $5^{th}$ generation, 5G, core network.

16. The radio network node of claim 10, the operations further comprising:

transmitting a request message to a second radio network node, the request message instructing the second radio network node to store context of the UE and to provide the first mobile identifier to the radio network node.

* * * * *